(12) United States Patent
Bao et al.

(10) Patent No.: US 11,946,821 B2
(45) Date of Patent: Apr. 2, 2024

(54) CAPACITIVE AND TACTILE SENSORS AND RELATED SENSING METHODS

(71) Applicant: The Board of Trustees of the Leland Stanford Junior University, Stanford, CA (US)

(72) Inventors: Zhenan Bao, Stanford, CA (US); Mark R. Cutkosky, Palo Alto, CA (US); Jooyeun Ham, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 275 days.

(21) Appl. No.: 17/255,704

(22) PCT Filed: Jul. 10, 2019

(86) PCT No.: PCT/US2019/041201
§ 371 (c)(1),
(2) Date: Dec. 23, 2020

(87) PCT Pub. No.: WO2020/014356
PCT Pub. Date: Jan. 16, 2020

(65) Prior Publication Data
US 2021/0278300 A1 Sep. 9, 2021

Related U.S. Application Data

(60) Provisional application No. 62/696,221, filed on Jul. 10, 2018.

(51) Int. Cl.
*G01L 5/165* (2020.01)
*B25J 19/02* (2006.01)
(Continued)

(52) U.S. Cl.
CPC ............... *G01L 5/165* (2013.01); *B25J 19/02* (2013.01); *G01L 1/146* (2013.01); *G08C 17/02* (2013.01)

(58) Field of Classification Search
CPC ........ G01L 5/165; G01L 1/146; B25J 13/084; B25J 19/00; G08C 17/02
(Continued)

(56) References Cited

U.S. PATENT DOCUMENTS

| 5,030,931 A | 7/1991 | Brooks et al. | |
|---|---|---|---|
| 6,697,261 B2 * | 2/2004 | Matsuda | ................. H01L 23/13 174/253 |

(Continued)

FOREIGN PATENT DOCUMENTS

| CN | 210689875 U | * | 6/2020 | |
|---|---|---|---|---|
| CN | 112539863 A | * | 3/2021 | ............. G01L 5/165 |

(Continued)

OTHER PUBLICATIONS

USPTO. International Search Report and Written Opinion dated Oct. 25, 2019, for parent PCT Application No. PCT/US2019/041201, 12 pages.

*Primary Examiner* — Octavia Davis Hollington
(74) *Attorney, Agent, or Firm* — Crawford Maunu PLLC

(57) ABSTRACT

Aspects of various embodiments are directed to sensor apparatuses and methods thereof. An example sensor apparatus includes a capacitor and sensor circuitry. The capacitor includes a first substrate having a first electrode, a second substrate having a second electrode, and a dielectric layer. The dielectric layer has a plurality of apertures arranged in a pattern, the first and second electrode being separated by the dielectric layer and arranged with an overlapping area with respect to one another. The sensor circuitry is coupled to the capacitor and configured and arranged to detect normal and shear forces applied to the sensor apparatus (Continued)

based on changes in capacitance derived from changes in at least one of a distance between the first and second electrodes and the overlapping area of the first and second electrodes.

22 Claims, 21 Drawing Sheets

(51) Int. Cl.
*G01L 1/14* (2006.01)
*G08C 17/02* (2006.01)
(58) Field of Classification Search
USPC .................................................. 73/862.626
See application file for complete search history.

(56) References Cited

U.S. PATENT DOCUMENTS

| | | | |
|---|---|---|---|
| 7,573,064 B2 * | 8/2009 | Benslimane | H01L 41/333 257/306 |
| 8,776,337 B2 * | 7/2014 | Homeijer | H01G 5/16 29/25.42 |
| 9,222,846 B2 * | 12/2015 | Lim | G01L 1/142 |
| 2006/0016275 A1 | 1/2006 | Gravesen et al. | |
| 2006/0079354 A1 | 4/2006 | Lammer | |
| 2009/0160461 A1 | 6/2009 | Zangl | |
| 2010/0282310 A1 | 11/2010 | Tsoi | |
| 2012/0105361 A1 | 5/2012 | Kremin | |
| 2014/0298921 A1 | 10/2014 | Surapaneni et al. | |
| 2016/0054813 A1 | 2/2016 | Schediwy et al. | |
| 2016/0256070 A1 | 9/2016 | Murphy et al. | |
| 2017/0045976 A1 | 2/2017 | Bushnell et al. | |
| 2017/0176266 A1 | 6/2017 | Mathieu et al. | |
| 2017/0248482 A1 | 8/2017 | Nishioki et al. | |
| 2020/0141818 A1 | 5/2020 | Bao et al. | |

FOREIGN PATENT DOCUMENTS

| | | | |
|---|---|---|---|
| CN | 115235654 | * | 10/2022 |
| JP | 2007534520 | | 11/2007 |
| JP | 2009009064 A | * | 1/2009 |

* cited by examiner

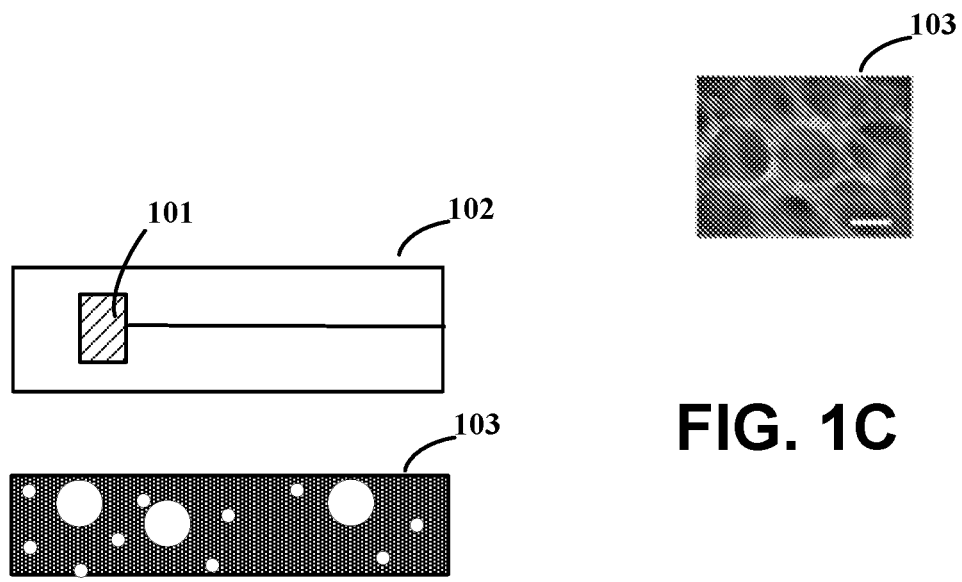
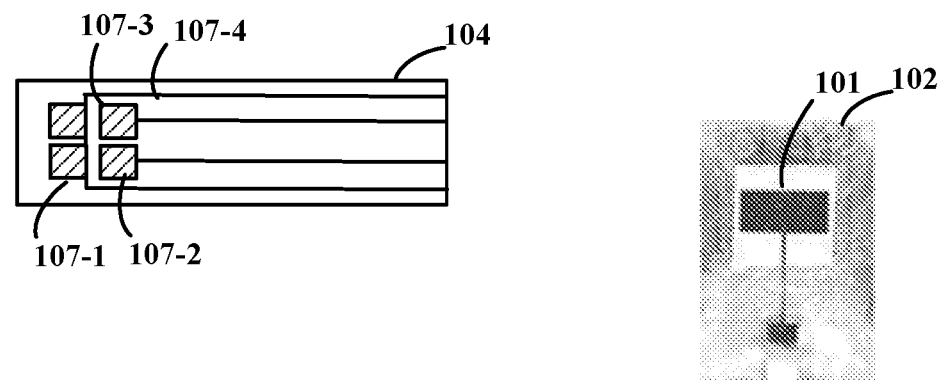
FIG. 1B
FIG. 1C
FIG. 1D

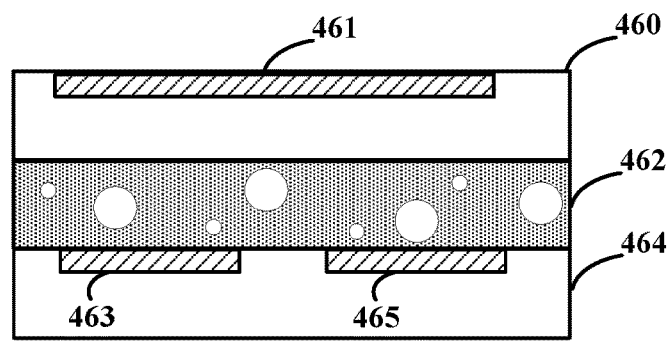
FIG. 4A
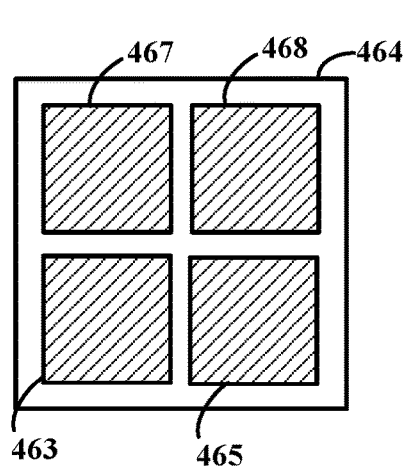 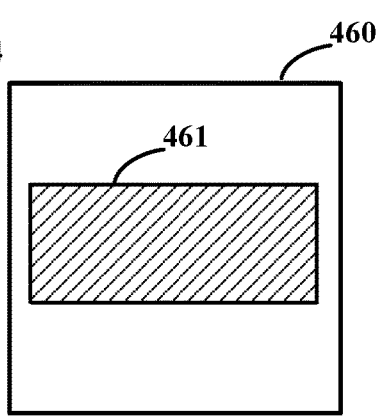 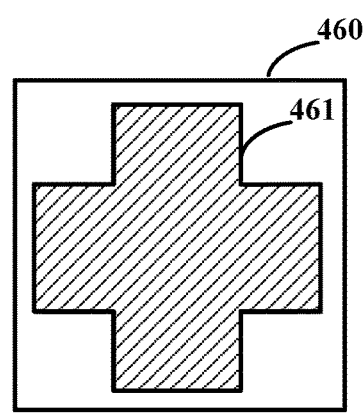
FIG.4B  FIG.4C  FIG.4D

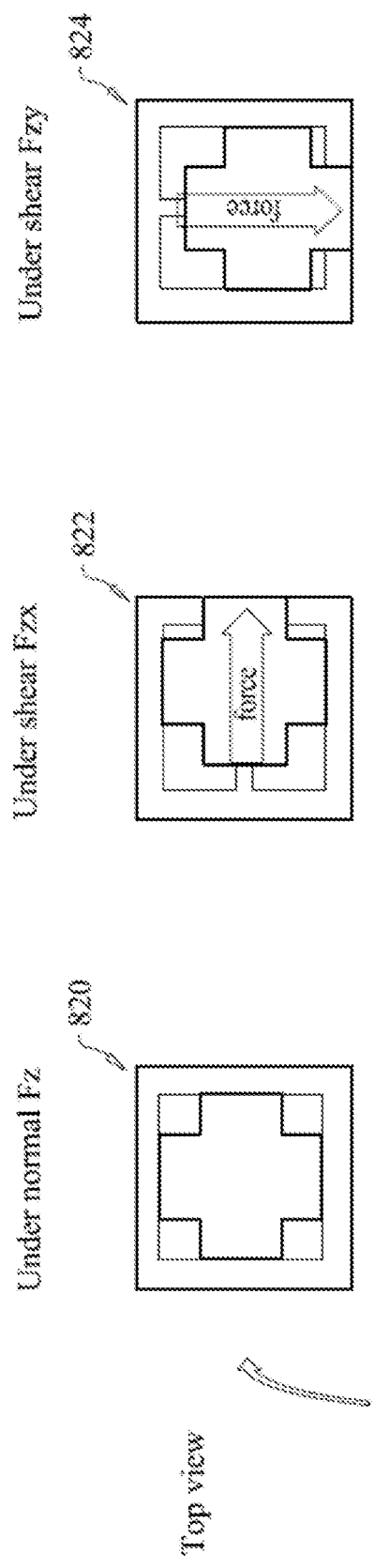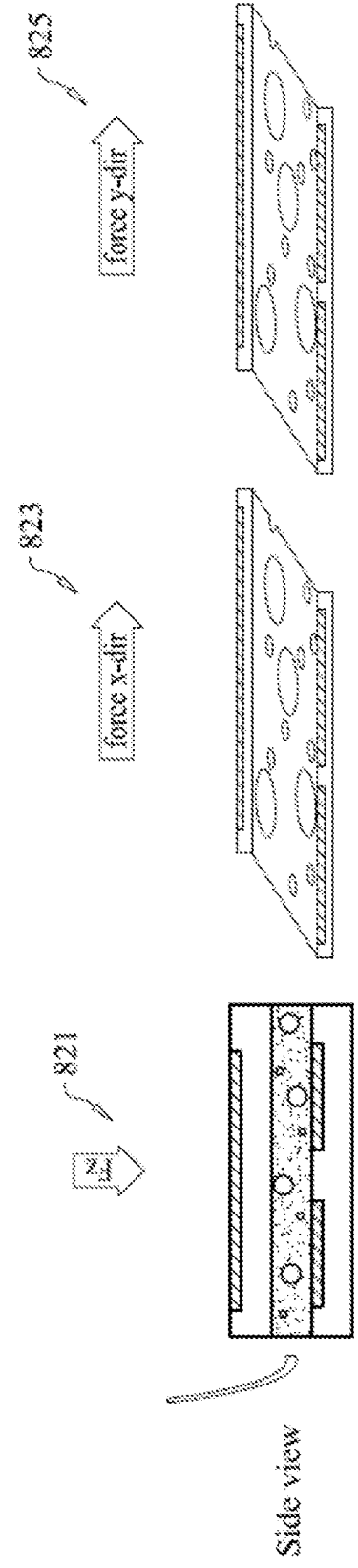
FIG. 8A
FIG. 8B

CAPACITIVE AND TACTILE SENSORS AND RELATED SENSING METHODS

OVERVIEW

Human or other animal skin provides a remarkable network of sensitive diverse sensors that provide sensitive pressure and vibration sensing. Skin can transduce environmental stimuli into physiological signals, which are then interpreted by the brain. Various force sensors and devices may attempt to mimic properties of human or animal skin to provide a variety of features.

The above issues as well as others have presented challenges to force sensors for a variety of applications.

SUMMARY

Aspects of various embodiments are directed to capacitive and/or tactile sensors and related sensing methods for sensing shear and normal forces, and for defining a magnitude of the shear and normal forces.

In the following discussion, various implementations and applications are disclosed to provide an understanding of the instant disclosure by way of non-limiting example embodiments.

In certain example embodiments, aspects of the present disclosure involve sensor circuitry specially configured to detect certain forces. For example, the sensor circuitry can be used to classify shear and normal forces, and defines both the magnitude of the force and the type of force. The sensor circuitry is configured to detect both static and dynamic forces and is formed of flexible substrates for application on curved surfaces, such as human skin.

More specific example embodiments are directed to a sensor apparatus that senses and/or detects and differentiates between types of forces applied to the sensor apparatus, such as shear and normal forces. The sensor apparatus is configured in a manner to: measure forces applied to the sensor circuitry based on changes in capacitance derived from changes in distance between electrode pairs of a capacitor of the sensor apparatus and/or changes in overlapping areas of the electrode pairs, and/or is formed using flexible substrates, such that the sensor apparatus can be applied to a variety of surfaces including skin and other edges or curved surfaces.

In specific aspects, the sensor apparatus includes a first substrate having at least one electrode and a second substrate having at least one electrode separated by a dielectric layer formed of a dielectric material having a plurality of apertures within and/or arranged in a pattern. The plurality of apertures can be arranged in a pattern within the dielectric material and can include apertures of different dimensions. For example, the plurality of apertures are arranged in a pattern to set a sensitivity of the sensor apparatus. The dielectric layer is arranged between the first and second substrates. The first and second substrates may be formed of a flexible material.

The sensor apparatus can detect, sense and/or define a magnitude of normal and shear forces by measuring changes in capacitance derived from changes in at least one of a distances between the first electrode of the first substrate and the second electrode of the second substrate and the overlapping area of first and second electrode. For example, the sensor circuitry distinguishes between shear and normal forces by obtaining a capacitance value from the electrode pairs and comparing the same. Normal forces can result in increases in capacitance values due to a decreased distance between the electrodes, and shear forces can result in decreases in capacitance values due to decreases in overlapping areas of the electrodes. Accordingly, the sensor apparatus can be used to distinguish between normal and shear forces by monitoring the changes in a capacitance value from the electrodes.

In various embodiments, the first substrate includes the first electrode, a third electrode, a fourth electrode, and a fifth electrode arranged in a pattern, and the second substrate includes at least the second electrode. The apparatus may further include processor circuitry in communication with the sensor circuitry. The sensor circuitry is configured and arranged to define a magnitude of the normal and shear forces by measuring changes in capacitance derived from changes in a gap distance between the first electrode and the second electrode and provide signals indicative of the magnitude of the normal, and comparing changes in capacitance derived from changes in an overlap area between the first electrode and the second electrode, the third electrode and the second electrode, fourth electrode and the second electrode, and fifth electrode and second electrode provides signals indicative of the magnitude of the shear forces to the processing circuitry.

In a number of related aspects, the sensor apparatus includes at least one capacitance-to-digital converter circuitry that connects the electrodes to an input channel of the capacitance-to-digital converter circuitry. The sensor circuitry can measure capacitance at a sampling rate using the capacitance-to-digital converter circuitry and connected processing circuitry. Additionally and/or alternatively, the apparatus includes one or more additional electrodes used as a part of a transducer circuit and further including a passively or inductively powered circuit configured to provide power to at least the sensor circuitry. The apparatus, in specific aspects, includes wireless communication circuit for wirelessly communicating signals from the sensor circuitry.

In some specific aspects, the apparatus includes a third substrates, the first substrate including the first electrode, the second substrate including at least the second electrode and a third electrode, and the third substrate including a fourth electrode. In such aspects, the dielectric layer includes a first dielectric layer arranged between the first and second substrates and a second dielectric layer arranged between the second and third substrates. The first and second dielectric layers may each include a plurality of apertures within.

In various aspects, the dielectric material and/or apertures can have a shape and dimensions targeted for force range and/or sensitivity of the sensor circuitry. The electrodes can be formed of a variety of different material such as metal, carbon nanomaterial, metal nanowires and conductive polymers, and the dielectric layer can be formed of a variety of polymers. For example, the sensor circuitry is configured and arranged to define a magnitude of x, y, z, and rotation forces by measuring changes in capacitance derived from changes in a gap distance between the first electrode and the second electrode and provide signals indicative of the magnitude of the x, y, z, and rotation forces to the processing circuitry A number of aspects are directed to methods of forming one or more of the above described sensor apparatuses. An example method includes printing electrode patterns on flexible substrates, such as by using photolithography, laser ablation, inkjet printing or three-dimensional (3D) printing, and providing a dielectric layer on a first of the flexible substrates. For example, the electrodes are printed to form a first flexible substrate having a first electrode and a second flexible substrate having a second electrodes. The dielectric layer, as provided on the first flexible substrate (such as by bonding techniques) is combined with the second flexible substrate such that the first and second electrodes are separated by an overlapping area with respect to one another. In specific aspects, building the dielectric layers includes photolithography, laser ablation, laser additive, inkjet printing, 3D printing, dissolvable material frame, emulsion droplet frame to sponge frame technique.

The method may further include combining the dielectric layer and the second flexible substrate includes forming a capacitor, and the method further includes coupling the capacitor to sensor circuitry configured and arranged to detect normal and shear forces applied to a sensor apparatus based on changes in capacitance derived from changes in at least one of a distance between first and second electrodes and the overlapping area of the first and second electrodes. As an example, combining the dielectric layer and the second flexible substrate includes bonding the dielectric layer to the second flexible substrate. Further, providing the dielectric layer may include curing and bonding the dielectric structure under a patterned electrode, as patterned on the flexible substrate. In various specific aspects, the method further including providing the formed sensor apparatus as part of a robotic or prosthetic apparatus. Additionally, the plurality of apertures are arranged in a pattern to set a sensitivity of the sensor apparatus.

In various specific aspects, the above-described sensor apparatus is formed as part of another apparatus, such as a robotic or prosthetic apparatus. As a specific example, the sensor apparatus can be part of a robotic hand. When applied in a robotic hand, the sensor apparatus can be used to detect slip of an object being held or touched by the robotic hand. In related specific aspects, the sensor apparatus is formed as part of another apparatus having a plurality of different types of sensors including the sensor circuitry, pressure sensor circuitry, strain sensor circuitry, and/or temperature sensor circuitry, among other types of sensors. The apparatus can further include a wireless communication circuit for wirelessly communicating signals from the sensor circuitry. In some related aspects, the apparatus includes one or more of the electrodes used as a part of a transducer circuit and further including a passively or inductively powered circuit configured to provide power to at least the sensor circuitry of the apparatus. The apparatus can further include a computer (e.g., CPU and/or microcontroller) to provide or assess the forces based on signals provided from the sensor circuitry.

The above discussion/summary is not intended to describe each embodiment or every implementation of the present disclosure. The figures and detailed description (and referring to the Appendix that was filed in the underlying Provisional Application and fully incorporated herein) that follow also exemplify various embodiments.

BRIEF DESCRIPTION OF FIGURES

Various example embodiments may be more completely understood in consideration of the following detailed description in connection with the accompanying drawings, in which:

FIGS. 1A-1D show example sensor apparatuses, consistent with embodiments of the present disclosure;

FIGS. 4A-4D show an example sensor apparatus, consistent with embodiments of the present disclosure;

FIGS. 8A-8B show an example of a sensor apparatus under different forces, consistent with embodiments of the present disclosure;

Figure 1A:
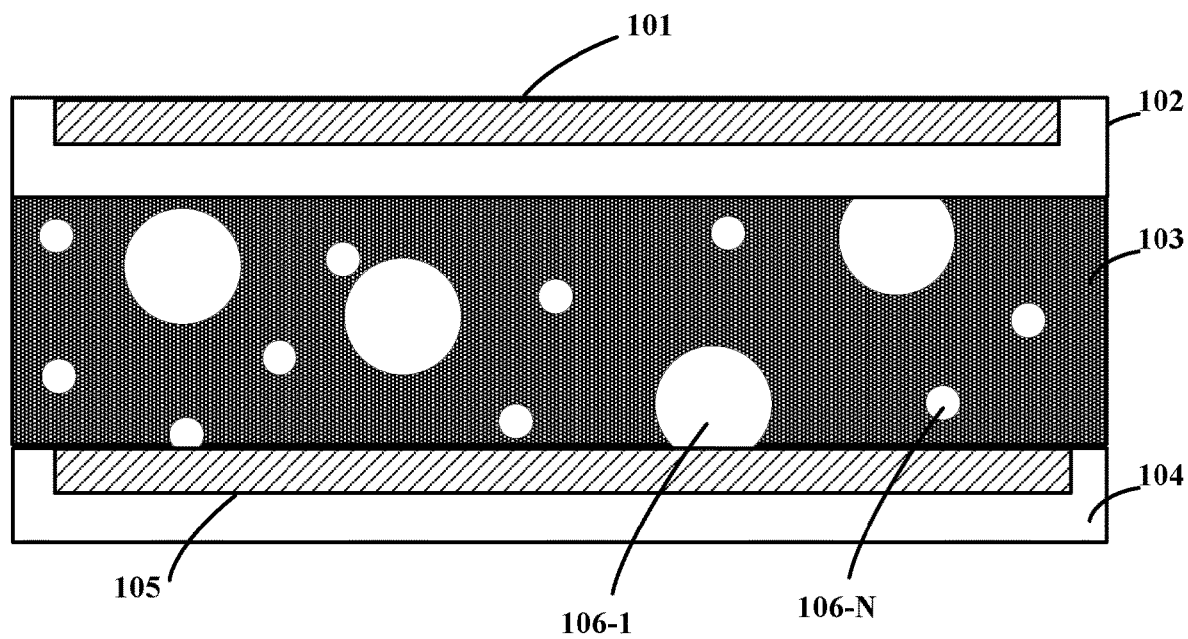

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses and methods involving a sensor apparatus that senses forces applied thereto and that defines both the magnitude and type of the force. In certain implementations, aspects of the present disclosure have been shown to be beneficial when used in the context of a skin-like tactile sensor for robotic or prosthetic application, such as robotic hands, but it will be appreciated that the instant disclosure is not necessarily so limited. Various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Particular example embodiments are directed to a sensor apparatus that can capacitively detect shear and normal tactile forces in multiple dimensions (e.g., a three-dimensional axis and in some instances, in two dimensions), and distinguishes the forces in the multiple dimensions. The sensor apparatus may define a magnitude and type of the forces based on a design of the dielectric layer and the electrodes of a capacitor of the sensor circuitry. Example sensor apparatuses include a capacitor formed of electrode pairs separated by a dielectric layer, and coupled to sensor circuitry. The dielectric layer is formed of a dielectric material having a plurality of apertures that are shaped to set a sensitivity and force range for the sensor circuitry. The electrodes are formed on flexible substrates, such that in various implementations, the sensor apparatus can be used in robotics, prosthetic and/or other applications that include surfaces that are curved or have edges. The sensor apparatus can be used in robotics and/or prosthetics to recognize a variety of forces, including both pressure and compression contact (e.g., a normal contact) and a shear slip. In many applications, a force applied on human skin is a combination of normal and two-plane shear forces referring to the skin. For example, the sensor apparatus can be used to classify the force modal, magnitude, and, in some instances, directions, and can be flexible to allow for coverage of surfaces of a robot, such as edges or curved ones.

The human skin, including mechanoreceptors, can be indispensable for dexterous activities: detection and reaction to contact by external agents, manipulation of contact location and force control, and exploration of surface texture and local features. In accordance with various embodiments, sensor circuitry is implemented in robotic and/or prosthetic apparatuses and used to accomplish dexterous activities using sensing information and interaction of the robotic/prosthetic with the environment, like a human. The tactile sensor circuitry, in accordance with various embodiments, can be implemented in robotics and/or prosthetics to provide dexterous activity by providing digital data that matches mechanical stimulations on the surface of interaction. In one particular experimental embodiment, the sensor circuitry can exhibit or meet a variety of criteria including, for example, a spatial resolution of 1 mm-5 mm (e.g., 1 mm in finger tips, 5 mm in the palm of the hand, and less than 4 millimeter (mm) for two-point discrimination for an example robotic application), a response time of 1 microsecond (ms) (or less), a force sensitivity of Newton (N), and can be flexible. However embodiments are not so limited. In other specific implementations, the spatial resolution, force sensitivity and/or response times may vary from the above-specific embodiments, such as exhibiting a spatial resolution of 2 mm-response time of 1 ms (or less)-5 ms, and/or a force sensitivity of 0.05N-600 kilopascal (kPa). The sensor circuitry can be used for tactile sensing of different kinds of dexterous activity (e.g., response, manipulation, and exploration) by meeting the above criteria and/or otherwise sensing normal and tangential forces and direction, as well as static and dynamic forces. The dielectric layer can be adjusted to set the sensitivity, as further described herein, such as by adjusting the modulus of the dielectric material (e.g., rubber) and the size, number, and/or shape of the apertures.

In specific embodiments, the sensor apparatus can be integrated into an electronic skin on robot hand or a prosthetic, which can provide skin-like functionalities measuring three-axis static and dynamic force and its direction with a flexible mechanical property. The tactile sensor can distinguish forces, such as both shear and normal forces, and measure both static and dynamic forces from any surfaces of robot skin or prosthetic with flexible mechanical properties. The static and dynamic forces can be measured from any surfaces of robotic skin or other types of surfaces. The advantage of the sensor apparatus is that design of electrode and dielectric layer enables the sensor to distinguish many kinds of tactile forces such as normal and two-plane shear forces, static and dynamic forces. Moreover, a target technical specification, including force range and sensitivity of sensor circuitry, can be varied by the modification of the dimensions of dielectric layer and apertures, as well as the specific material. The sensor circuitry or multiple sensor circuits can be used as a replacement for human mechanoreceptors, including use in robotics and/or prosthetic applications. For example, multiple sensor circuits can be placed on robot surfaces and used to give real-time force feedback to the robot. The dimensions of the sensor apparatus can be modified so that the range and resolution is tailored to meet the needs of different robotic (or prosthetic) applications.

The dielectric layer of the sensor apparatus can consist of a dielectric structure (e.g., material) having a plurality of apertures therein. The dielectric layer is formed between two substrates, each having at least one electrode. By designing the shape of electrodes and dielectric layer, the sensor apparatus can respond to multimodal external stimulation. The sensor apparatus can include a specific design, whereby multiple electrodes detect force (normal/shear and static/dynamic) and, in some embodiments, direction simultaneously.

Turning now to the figures, FIGS. 1A-1D show example sensor apparatuses, consistent with embodiments of the present disclosure. The sensor apparatuses include a capacitor coupled to sensor circuitry and used to detect both the type and magnitude of force applied, detect static and dynamic forces, and are flexible for application on surfaces that are not smooth, such as human skin. Furthermore, the sensor circuitry can detect a direction and vibration of an applied force.

As shown by FIG. 1A, the sensor apparatus includes a capacitor formed of at least two substrates 102, 104. The substrates 102, 104 each include at least one electrode 101, 105 and are separated from one another by a dielectric layer 103. In specific embodiments, the substrates 102, 104 are formed of a flexible material and the electrodes 101, 105 can be formed on the flexible substrates. The first substrate 102 can include one or more electrodes and the second substrate 104 can include one or more electrodes (e.g., such as illustrated by FIG. 4A) forming one or more electrode pairs. In various embodiments, each substrate 102, 104 can include one or more electrodes of a variety of shapes.

The dielectric layer 103 can include a structure formed of a stretchable elastomer, such as Polydimethylsiloxane (PDMS), Polyurethane (PU), poly(styrene-butadiene-styrene) (SBS), styrene butylene styrene (SEBS), poly(vinylidene fluoride-co-hexafluoropropylene) (PVDF-HFP), although embodiments are not so limited. In specific embodiments, the dielectric layer 103 includes a dielectric material having a plurality of apertures 106-1, 106-N formed therein. The apertures 106-1, 106-N can be a variety of shapes and dimensions, which can be used to set the sensitivity of the sensor apparatus.

The sensor apparatus may be used to detect the magnitude and direction of a randomly-combined force including normal, shear, and rotation forces with high sensitivity and sensing range. In various specific embodiments, the sensor apparatus is used to measure a capacitive transduction system that takes advantage of the unique geometry of capacitive electrodes and microstructure of dielectrics. By using the combination of the electrode and dielectric design, the flexible sensor apparatus can detect from small (1 kPa) to large forces (300 kPa normal, 33 kPa shear) and distinguish four different force components (x, y, z, rotation) at the same time.

FIG. 1B-1D illustrates a specific example sensor apparatus, which is consistent with the sensor apparatus of FIG. 1A. The sensor apparatus has two substrates 102, 104 that each include at least one electrode 101, 107-1, 107-2, 107-3, 107-4 and are separated from one another by a dielectric layer 103 having apertures therein (e.g., is porous). In the specific embodiment, the first substrate 102 has one electrode 101 and the second substrate 104 has four electrodes 107-1, 107-2, 107-3, 107-4, such that there are four electrode pairs between the first and second substrates 102, 104. FIG. 1C illustrates an example of a dielectric layer 103 that is porous. FIG. 1D illustrates an experimental example of a first substrates 102 with an electrode 101. In such embodiments, the sensor apparatus has four channel electrodes 107-1, 107-2, 107-3, 107-4 and which are used to distinguish four directional forces using four inputs (e.g., four capacitive vales between the electrode 101 and each of the electrodes 107-1, 107-2, 107-3, 107-4) that provide four different variables (e.g., x, y, x, and rotation).

The capacitance may be measured between the rectangular-shaped ground electrode 101 at the first substrates 102 and the four channels of square-shaped electrodes 107-1, 107-2, 107-3, 107-4 of the second substrate 104 and across the dielectric layer 103 as shown in FIG. 1B. Two layers of electrodes store electric charges which leads to change in capacitance. An intermediate dielectric layer 103 provides separation and insulation of capacitors and is polarized by an applied electric field on the electrode layers. The sensor apparatus may be encapsulated with shield layers from the top and bottom to prevent electric noise from the surrounding environment for measurement studies. The ground electrode (e.g., electrode 101) is aligned with the center of the four-channel electrodes (e.g., electrodes 107-1, 107-2, 107-3, 107-4) to distinguish in-plane forces, x-directional shear force, y-directional shear force, and one more in-plane force, z-centered rotation. The four capacitors between one ground electrode (e.g., electrode 101) and four-channel electrodes (e.g., electrodes 107-1, 107-2, 107-3, 107-4) are herein sometimes referred to as "C1, C2, C3, and C4", from the left top of the second substrate 104 in clockwise for ease of reference. The capacitance of the sensor varies depending on the overlapped area between the four bottom channel electrodes 107-1, 107-2, 107-3, 107-4 and one top ground electrode 101 through the sandwiched dielectrics. As a specific example, the sensor apparatus can define (+) or (−) direction of x-directional shear by comparison of C1, C4 and C2, C3 pairs, (+) or (−) direction of y-directional shear force by comparison of C1, C2 and C3, C4 electrode pairs, and clockwise (CW) or counter-clockwise (CCW) direction of z-centered rotational force by comparison of C1, C3 and C2, C4. The sensor apparatus may distinguish four different directional forces (x, y, z, rotation).

As shown, the dielectric layer 103, which is a stretchable porous elastomer structure that deforms and stretches in both normal and in-plane direction sensitively, is sandwiched between the first and second substrates 102, 104. The apertures (e.g., pores) can be made using various fabrication methods, inkjet or three-dimensional printing, sponge frame, water dissolvable material frame or microfluidic-assisted emulsion droplet frame. As shown in FIG. 1B, air pores of diameter (1-500 μm) in the elastomer matrix provide empty spaces compared to elastomer layer without pores.

The dielectric layer 103 having apertures may provide particular sensitivity, which is provided by a deformable empty cavity for multi-dimensional stresses. The material of the dielectric layer 103 may be an elastomer which has not only elasticity and low hysteresis, it also exhibits low Young's modulus (E1=0.2~2 MPa) with high stretchability (e=30~1000%) such that the dielectric layer 103 deforms sensitively in all directional forces. By using this material, the sensor apparatus includes a microstructure design to create much lower modulus (E) of the structure as follows the Eqn. 1:

$$E=E_1 v_1 + E_2 v_2$$

$$v_1 + v_2 = 1.$$

where E1 is the elastic modulus of filler, E2 is the elastic modulus of the matrix, v1 is the volume fraction of filler and v2 is the volume fraction of the matrix. Due to the deformability with low hysteresis material and the low modulus dielectric structure, the sensor apparatus can respond to a small force, which induces the high sensitivity of the sensor for multi-axial forces.

The dielectric layer 103 having apertures may also provide a wide sensing range as the porous structure has a wide and homogeneous contact area for adhesion between electrodes and dielectric structures compared to other dielectric structures, such as micro-chuck-, micro-pillar, and micro-pyramid-structure. The porous dielectric structure has a large contact and adhesive area between the dielectric surface and electrode surface, when it is sandwiched and fixed in two electrode layers. When an in-plane force is applied, unlike tearing dielectric structures, the porous dielectric layer 103 distributes the strain through the elastomer network and prevents damage of the interface between the electrode and dielectric layer(s) 103. As such, the sensing range of the sensor is high (e.g., 500 kPa normal, 33 kPa shear) in all directions.

The sensor performance can be tuned by controlling or adjusting the size of pores. A large porous elastomer, fabricated by a sponge frame or a Microfluidic-assisted Emulsion Self-Assembly (DMESA) technique, provides a sensor with a high force sensitivity by low Young's modulus of a large porous structure made of stretchable elastomer. A smaller porous structure, fabricated by salt- or sugar-like water-soluble material frame technique, provides a sensor with a wide force sensing range by stronger adhesion through wide contact area between dielectric structure and electrodes by more elastomeric material on the surface compared to the air cavity. The sensor apparatus can be tuned based on its target application by tuning its fabrication techniques and parameters.

In various specific examples, the sensor apparatus senses forces using the dielectric layer 103 to detects and discriminates a z-directional normal force as the thickness of the dielectric layer 103 of all four electrode pairs decreases while the overlap area of C1 to C4 stays without a change. When normal pressure is applied, the air in the pores are removed and the pores deform from spherical shape to elliptical shape as the thickness-axial distance decreases. As a result, when the z-directional normal force is applied, capacitances of C1 to C4 increase or decrease equally, which is used to distinguish normal force from a combined force including normal, shear, and rotation forces. Measuring the average of the capacitance of all four capacitance can define z-directional normal force.

When in-plane linear or rotational force is applied, the dielectric layer 103 deforms and stretches in x-direction, y-direction or z-centered-rotational-direction while it supports electrode pairs linearly or rotationally moved to each other. For instance, when in-plane pressures are applied, the pores, which form spherical air void in the dielectric layer 103, deform from spherical shape to elliptical shape as the force-directional-axis' distance of elliptical shape increases. While the pores and the dielectric layer 103 deform, the dielectric layer 103 supports and moves the upper electrode layer (e.g., substrate 102), which changes the overlap area between the upper and the lower electrode(s) and changes the capacitance (e.g., each capacitor increase or decrease in two pairs equally). Comparing and subtracting the change of the capacitance of all four capacitors can define the magnitude and direction of in-plane pressures. The dielectric layer 103 is used to detect and discriminate each of in-plane linear and rotational force by an increase or decrease of different two pairs' capacitance among the four capacitors increase or decreases. For example, when the x-directional shear force is applied, while the gap distance is fixed with a normal force, the overlap area and capacitances of C1 and C2 increase when C3 and C4 decrease, which is a unique response of x-directional shear force such that it is used to distinguish normal force from a combined force including normal, shear, and rotation forces. When the y-directional shear force is applied, capacitances of C1 and C4 increase when C2 and C3 decrease, which is a unique response of y-directional shear force. When the z-centered rotational shear force is applied, capacitances of C1 and C3 increase when C2 and C4 decrease, and it is a unique response of z-centered rotational shear force.

Figure 2A:
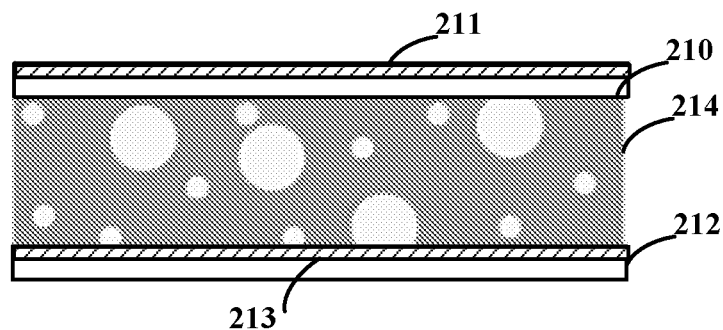
FIGS. 2A-2C show an example sensor apparatus under different forces, consistent with embodiments of the present disclosure.
Figure 2B:
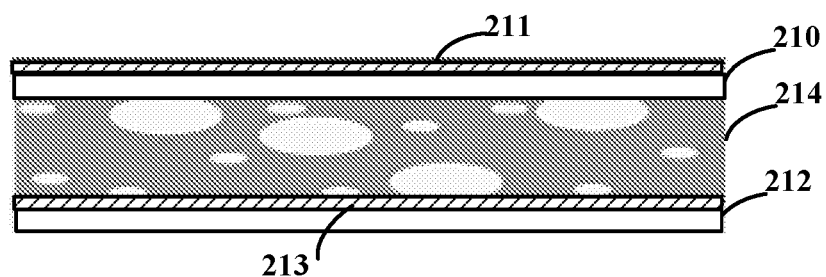
Figure 2C:
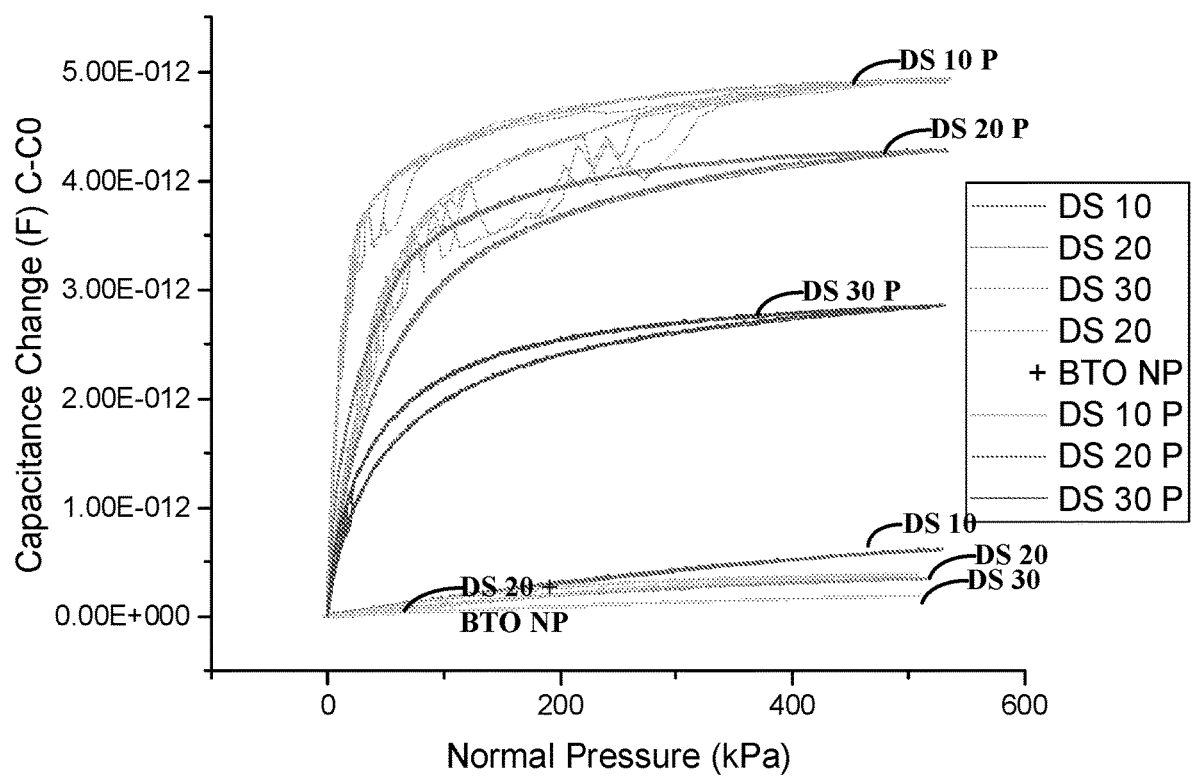

FIGS. 2A-2C show an example sensor apparatus under different forces, consistent with embodiments of the present disclosure. As illustrated by FIGS. 2A-2B, in some embodiments, the sensor apparatus can include one or more capacitors formed of at least two substrates 210, 212. For example, the sensor apparatus includes two substrates 210, 212, each substrate having at least one electrode 211, 213, and being separated by a dielectric layer 214. The substrates 210, 212 are formed of a flexible material and the electrodes 211, 213 can be formed on the flexible substrates. The first substrate 210 is separated from the second substrate 212 by the dielectric layer 214 formed of a dielectric material having a plurality of apertures. The electrodes of the second substrate 212 can include a first electrode 213 that is on a surface proximal to the dielectric layer 214. In specific embodiments, each of the electrodes 211, 213 can be rectangular shaped, however embodiments are not so limited.

The dielectric layer 214 includes the plurality of apertures formed therein. In specific embodiments, the plurality of apertures can include different shapes and/or dimensions. Although the embodiments herein illustrate the apertures as circles, when no force is applied, embodiments are not so limited and the apertures can be a variety of shapes.

As previously described, the magnitude of normal and shear static forces can be measured by measuring, monitoring and/or analyzing changes in capacitance derived from changes in distances between an electrode pair 211, 213 (e.g., the gap distance) and changes in overlapping areas of the electrode pair 211, 213 (or electrode pairs in various embodiments), respectively. The normal and shear forces can be distinguished based on the comparison of capacitance from each electrode pairs. As used herein, normal forces includes or refers to pressure or compression forces on the sensor circuitry.

To measure a normal force, for example, when normal force is applied to the sensor apparatus, as illustrated by FIG. 2B, the gap distance (e.g., distance between the electrode pairs 211, 213 and/or the electrode and the other/upper substrate 210, 212) decreases (or otherwise changes) equally on the electrodes 211, 213 of the first and/or second substrates 210, 212, leading to equal changes in capacitance in and/or all electrode pairs. The normal force can be classified by the average of capacitance of the electrode pair 211, 213.

FIG. 2C illustrates capacitance results of the electrodes when the normal force is applied, as illustrated by FIG. 2B and to the apparatus as illustrated by FIGS. 2A-2B. Capacitance can increase while a normal force is applied, such as normal forces between 0 to 600 kPA. FIG. 2C illustrates a sensitivity and hysteresis of sensor apparatuses having different modulus dielectric layers with different sized apertures. For example, lower modulus (e.g., DS 10) silicon rubber with apertures of DS 10 P can have a higher sensitivity and high modules (e.g., DS 30) dielectric layers with apertures of DS 30 P have a better hysteresis with respect to one another. More specifically, FIG. 2C illustrates the results of five cycles of 50N normal forces applied to the sensor apparatus illustrated by FIGS. 2A-2B.

The changes in capacitance can be used to distinguish between normal and shear forces. For example, normal forces can result in increased capacitance and shear force result in decreases in capacitance, as further described herein. In some specific embodiments, the changes in capacitance can be used to determine the direction of the force by comparing the different changes of capacitance in electrode pairs. The overlapped areas on the electrode pairs exhibit distinct changes in their capacitances according to the direction of force. In some embodiments, the first and second substrates can form multiple electrode pairs to distinguish directions. For instance, when an x-directional shear force is applied from left to right side, the overlapped area, which is proportional to the capacitance, of left electrode pairs decrease, while the others increase in response to changes of overlapped area. These differing behaviors enable the sensor circuitry to determine the direction of shear force. When a y-directional shear force is applied from top to bottom side, the overlapped area and capacitance of one electrode pairs decrease, while the others increase or stay the same. As would be appreciated by one of skill, left/right, top/bottom is with reference to the respective top views and upper/lower is with reference to the side views.

In such embodiments that include multiple electrode pairs, the sensor circuitry can distinguish between torsion and diagonal shear force based on the design of the electrode pairs. For example, the sensor circuitry can monitor the changes in capacitance exhibited by the electrode to distinguish between the torsion and diagonal shear forces. The sensor circuitry can measure dynamic force by using the same transduction technology used for the static force by applying a high sampling rate (>500 Hz).

In specific embodiments, the sensor circuitry includes at least one capacitance-to-digital converter (CDC) circuitry that connects at least some of the electrodes to an input channel of the CDC circuitry. The sensor circuitry can measure dynamic forces by measuring capacitance at a sample rate using the CDC circuitry and connected processing circuitry (e.g., microcontroller). To measure dynamic force by such a sampling rate, the sensor uses two CDC circuitry (Capacitance-to-Digital Converter chips) to connect the electrode pairs to 2 of the 12 analog input channels of each chips, since a high sampling rate (>500 Hz) can be obtained from a lower number of capacitor inputs to the chip. The CDC chip consists of a sigma-delta-based CDC with 12 analog input channels and communicates with a microcontroller via an I2C bus, measuring capacitance in 0.3-1.2 kHz sampling rate, and cancelling noise from capacitors through active shield function. For more information on CDC chips and active shield function, reference is made to AD7147, Analog, http://www.analog.com/media/en/technical-documentation/data-sheets/AD7147.pdf, which is fully incorporated herein by reference.

In some embodiments, the apparatus further includes one or more additional electrodes used as a part of a transducer circuit and further including a passively or inductively powered circuit configured to provide power to at least the sensor circuitry of the apparatus. The apparatus can further include a computer (e.g., CPU and/or microcontroller) to provide or assess the forces based on signals provided from the sensor circuitry.

The fabrication process for the tactile sensor can include electrode formation, dielectric layer formation, and bonding. The fabrication processing can include printing electrode pairs on one or more flexible substrates, building a dielectric layer on a first (or more) of the flexible substrates, bonding the dielectric layer of the first flexible substrate to a second flexible substrate, and optionally, repeating the process for additional layers to build a stack of electrode pairs. To print electrode patterns on flexible substrates, photolithography, laser ablation, inkjet printing or three-dimensional (3D) printing can be employed on flexible substrate. To build dielectric layers on these patterned electrodes, a dielectric structure is made with various methods; such as photolithography, laser ablation, laser additive, inkjet printing, 3D printing, dissolvable material frame, emulsion droplet frame to sponge frame technique. This solidified dielectric structure can bond to a patterned electrode by chemical bond (e.g., chemical glue). Further, the dielectric layer bonded to the electrode is bonded to another electrode by plasma treatment and, optionally, the process may be repeated to stack two electrode pairs. In various specific embodiments, the fabrication process can automate alignment of electrode pairs within the sensor circuitry.

Embodiments in accordance with the present disclosure can include various modification from that illustrated by FIGS. 1A-1D and FIGS. 2A-2B. The modifications can include modification of the dimensions of dielectric (micro) structures (e.g., apertures) which can vary for target technical specification including force range and sensitivity of sensor, materials can be substituted such as carbon nanomaterial, metal nanowires, and conductive polymers for electrode and any kind of polymers for dielectric, and the dielectric structure can be modified from circular pillar to plate or rectangular-shaped structure, such as for a one-pixel sensor.

In some specific embodiments, the sensor apparatus can include more than two substrates, such as three substrates, each substrate having at least one electrode, and being separated by dielectric layers. The substrates are formed of a flexible material and the electrodes can be formed on the flexible substrates. The first substrate can include an electrode and a first dielectric layer can be formed on the first substrate proximal to the electrode. The second substrate includes a first electrode and, optionally, a second electrode. The first and second electrodes of the second substrate are arranged to overlap and to be perpendicular to one another, thereby forming different channels (e.g., CH1 and CH2). The second substrate is separated from the first substrate via the first dielectric layer. The first electrode of the second substrate is proximal to the first dielectric layer. A second dielectric layer can be formed on the second substrate proximal to the second electrode (or on the third substrate proximal to electrode). The second dielectric layer separates the second substrate from a third substrate which includes an electrode. The first and, optionally, second electrodes of the second substrate are effectively sandwiched between the first substrate and the third substrate by the first and second dielectric layers. As may be appreciated by one of ordinary skill, the sensor apparatus, such as that illustrated by FIG. 9, includes a stack of two electrode pairs. The first electrode pair is formed by the electrode of the first substrate and first electrode of the second substrate. The second electrode pair is formed by the second electrode of the second substrate and the electrode of the third substrate.

Figure 3B:
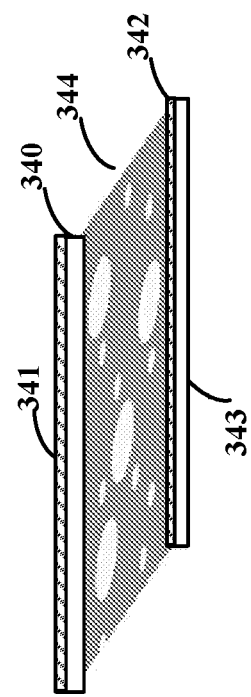
FIGS. 3A-3C show an example sensor apparatus under different forces, consistent with embodiments of the present disclosure.
Figure 3A:
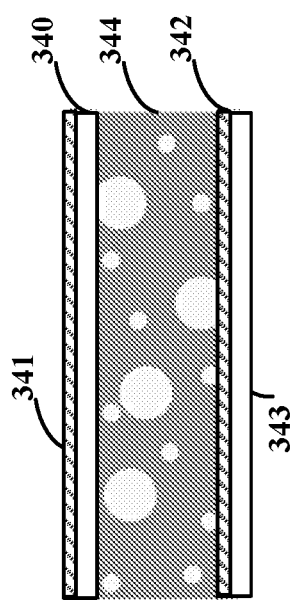
Figure 3C:
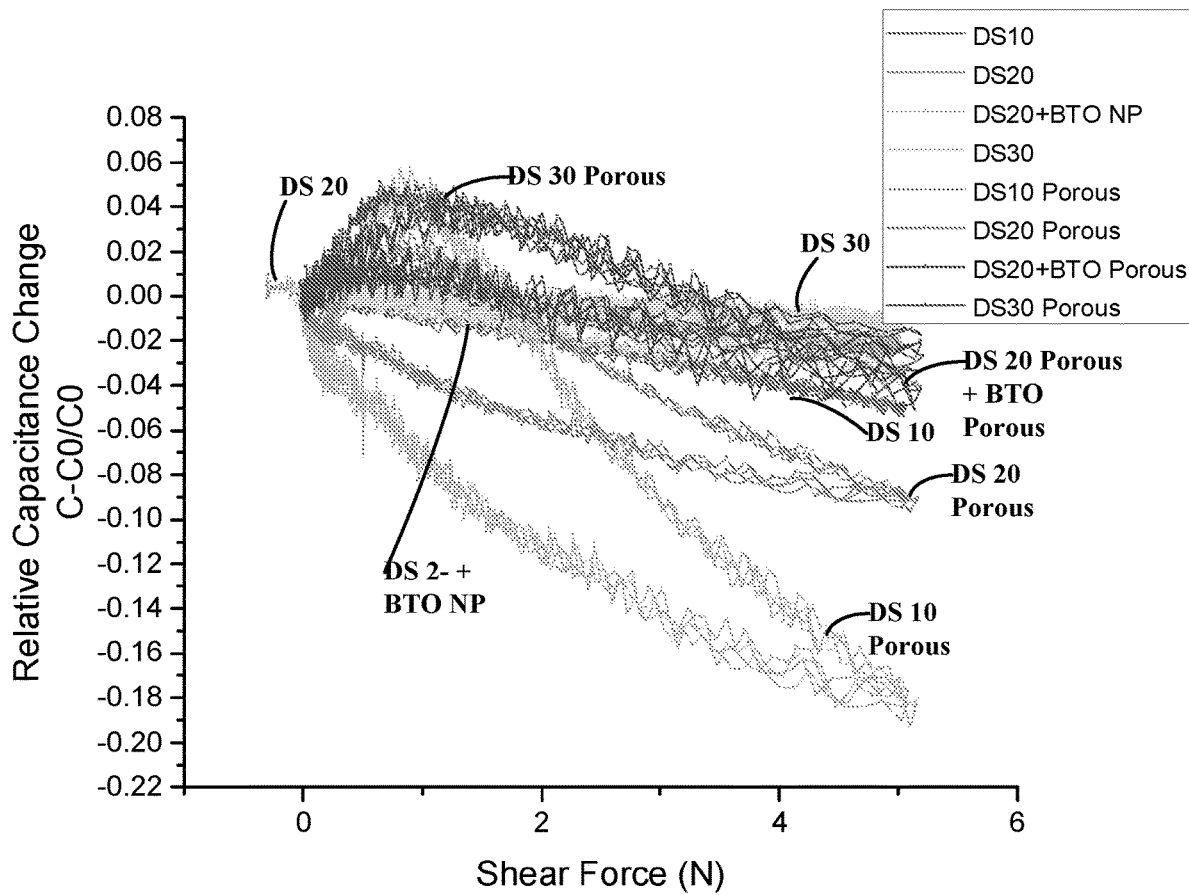

FIGS. 3A-3C show an example sensor apparatus under different forces, consistent with embodiments of the present disclosure. The sensor apparatus can include the sensor apparatus as illustrated by FIGS. 1A-1D and 2A-2B, in various specific embodiments, including a first substrate 340 having at least one electrode 341 and a second substrate 342 having at least one electrode 343. The first and second substrates 340, 342 are separated by a dielectric layer 344 having a plurality of apertures.

The sensor apparatus can be used to measure the magnitude of normal and shear static forces, similar to the above described sensor circuitry illustrated by FIGS. 2A-2C by analyzing changes in capacitance derived from changes in a gap distance and overlapping electrode area, respectively, of one or more of the electrode pairs. The normal and shear forces can be distinguished based on the comparison of capacitance from the one or more of the electrode pairs.

To measure a normal force, for example, when normal force is applied as illustrated by FIG. 2B, the gap distance decreases or otherwise changes for the (or all) electrode pairs, leading to changes in capacitance in both electrode pairs. The normal force can be classified by the average of capacitance of the two (or more) electrode pairs. By contrast, as shown by FIG. 3B, shear force can result in decreases in overlap areas between the electrodes of the first and second substrate 340, 342 and in capacitance decreases. The decrease or increase in capacitance can be used to distinguish between shear and formal forces. In some more specific embodiments, in which the sensor apparatus includes more than one pair of electrodes (e.g., electrodes 341, 343), the direction of a shear force can be determined by comparing the different changes of capacitance in the electrode pairs. For example, one or more of the first and second substrates 340, 342 can include more than one electrode, thus forming more than one electrode pair with the electrode of the other of the first and second substrates 340, 342.

FIG. 3C illustrates capacitance results of the electrodes when the shear force is applied, as illustrated by FIG. 3B and to the apparatus as illustrated by FIGS. 3A-3B. Capacitance can decrease while a shear force is applied as the overlapping area decreases, such as a shear force of between 0-6 N (or greater than 50 kPa). FIG. 3C illustrates a sensitivity and hysteresis of sensor apparatuses having different modulus dielectric layers with different sized apertures. For example, lower modulus (e.g., DS 10) silicon rubber with apertures of DS 10 P can have a higher sensitivity and high modules (e.g., DS 30) dielectric layers with apertures of DS 30 P have a better hysteresis with respect to one another. More specifically, FIG. 3C illustrates the results of five cycles of 5N shear forces applied to the sensor apparatus illustrated by FIGS. 3A-3B.

The overlapped areas on the one or more electrodes pairs exhibit distinct changes in capacitances according to the direction of force due to the arrangement of the apertures of the dielectric layer 344 (e.g., changing shapes of the apertures causing different changes in capacitance at different portions of the first and second substrates 340, 342). For instance, when an x-directional shear force is applied from right to left side, as illustrated by FIG. 3B, the overlapped area, which is proportional to the capacitance, of an electrode pair 341, 343 decreases. In some embodiments, the sensor apparatus includes more than one electrode pair, and the other electrode pair remains the same or decreases a lower amount than the electrode pair in response to the x-direction shear force. These differing behaviors allow for the sensor circuitry to determine the direction of shear force. When a y-directional shear force is applied from top to bottom side (or vice versa), the overlapped area and capacitance of the one of the electrode pairs decreases, while the other electrode pair remains the same or decreases a lower amount than the electrode pair.

In various specific embodiments, the sensor circuitry can distinguish between torsion and diagonal shear force, although embodiments are not so limited. When torsion is applied, capacitance changes in the quadratic since the overlapped area changes. On the other hand, diagonal shear force changes overlapped area between electrode pairs in rectangles that changes capacitance in linear. Similar to the x-axis or y-axis shear force as shown by FIG. 7B, the changing shape of the overlapped area between electrode pairs is rectangular when diagonal shear force is applied to the sensor circuitry.

The sensor can measure dynamic force by using the same transduction technology used for the static force by applying a high sampling rate (>500 Hz). As previously described, to measure dynamic force by such a sampling rate, the sensor uses two CDC (Capacitance-to-Digital Converter) chips to connect the two electrode pairs to 2 of the 12 analog input channels of each chip.

FIGS. 4A-4D show an example sensor apparatus, consistent with embodiments of the present disclosure. In various embodiments, the sensor apparatus includes more than two electrodes 461, 463, 465.

As shown by FIG. 4A, the sensor apparatus includes a capacitor formed of at least two substrates 460, 464. The substrates 460, 464 each include at least one electrode 461, 463, 465 and are separated from one another by a dielectric layer 462. In specific embodiments, the substrates 460, 464 are formed of a flexible material and the electrodes can be formed on the flexible substrates. The first substrate 464 can include four electrodes 463, 465 (as further illustrated by FIG. 6A) and the second substrate 460 can include rectangular-shaped electrode 461, as illustrated by FIG. 4C (apparent among other figures herein) or a cross-shaped electrode 461, as illustrated by FIG. 4D. The four electrodes can be square or rectangular shaped, although embodiments are not so limited. The dielectric layer 462 includes a plurality of apertures formed therein, as previously described.

The sensor circuitry is coupled to the capacitor formed of the at least two substrates 460, 464 and the dielectric layer 462. The sensor circuitry detects normal and shear forces applied to the sensor apparatus based on changes in capacitance derived from changes in at least one of a distance between the electrodes 461, 463, 465 and the overlapping area of the electrodes 461, 463, 465.

FIGS. 4B-4C illustrates different first and second substrates 464, 460. More specifically, FIG. 4B illustrates an example second substrate 464 having four square-shaped electrodes 463, 465, 467, 468, although embodiments are not so limited and the electrodes may be different shapes such as rectangular or circular. FIG. 4C illustrates an example first substrate 460 having one rectangular shaped electrode 461 and FIG. 4D illustrates an example first substrate 460 having one cross shaped electrode 461.

FIGS. 5A-5D show an example of fabricating a sensor apparatus, consistent with embodiments of the present disclosure. The sensor apparatus may be consistent with the sensor apparatus illustrated by FIG. 4A and having the first substrate as consistent with FIG. 4C and the second substrates as consistent with FIG. 4B. In specific embodiments, the apparatus includes a first substrate 567 having a rectangle-shaped electrode 571, a second substrate 570 having four square-shaped electrodes 572, 573, 574 and 575, and a dielectric layer 569 having apertures therein, although embodiments are not so limited and may include more or fewer electrodes and/or different shaped electrodes.

In some specific embodiments, the sensor apparatus is formed of a flexible metalized mylar, hundreds nm-thick conductive material is ablated or printed on top of a micron-thick flexible film, including Polyethylene terephthalate (PET), PolyImide Kapton (PI), and ITO film, and a stretchable elastomer having the apertures. The elastomer may be Polydimethylsiloxane (PDMS), Polyurethane (PU), poly(styrene-butadiene-styrene) (SBS), styrene butylene styrene (SEBS), poly(vinylidene fluoride-co-hexafluoropropylene) (PVDF-HFP), among other elastomers that can form porous structures and in which the pores do not stick to one another when pressed with pressure. These materials are selected by considering mechanical and electrical properties of the target application. The electrode material is flexible and the dielectric material is flexible and stretchable, such that the resulting sensor is responsive to multi-axis force. The aperture (or pore) sizes may be adjusted, for example, for different capacitance base values and sensitivity (e.g., small pores for thinner layers and higher base capacitance values, large pores for more sensitivity). Higher dielectric elastomer is also expected to be more sensitive.

Figure 5A:
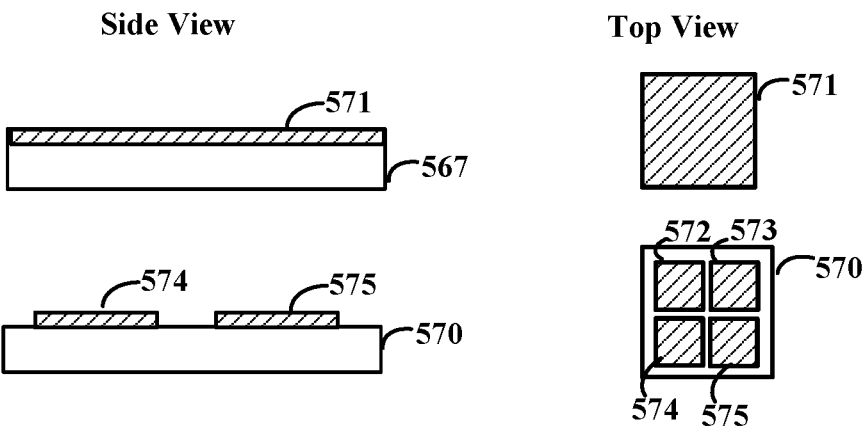
FIGS. 5A-5D show an example of fabricating a sensor apparatus, consistent with embodiments of the present disclosure.
Figure 5B:
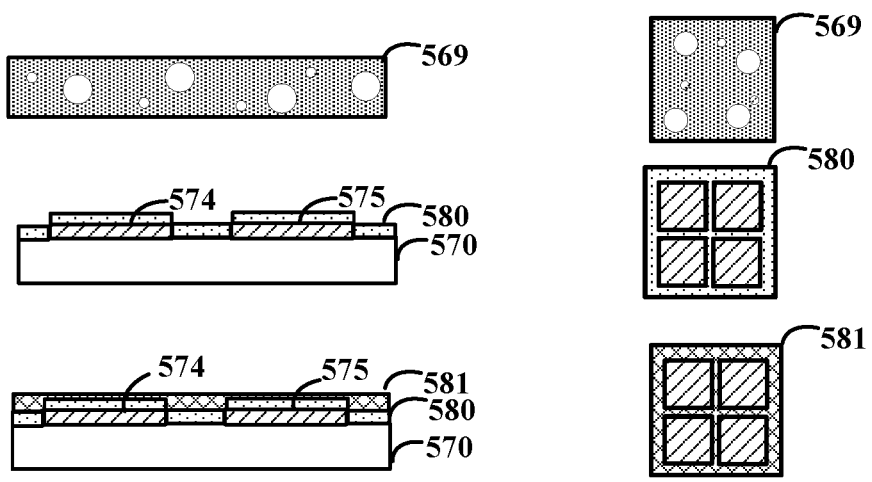
Figure 5C:
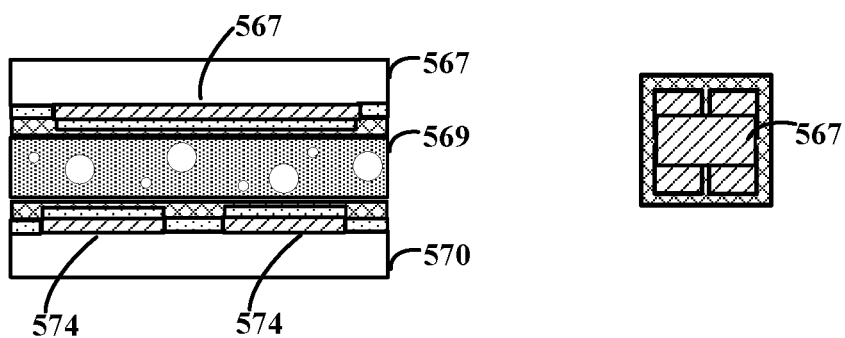
Figure 5D:
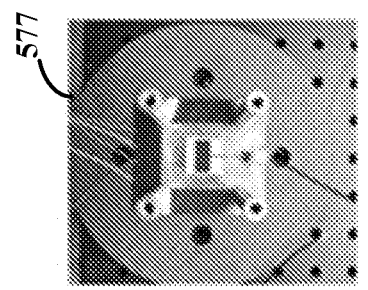
Figure 5D:
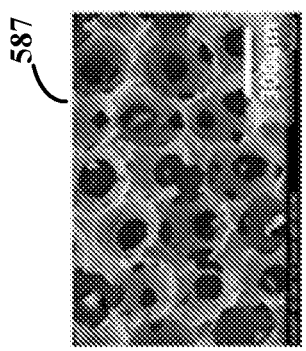
Figure 5D:
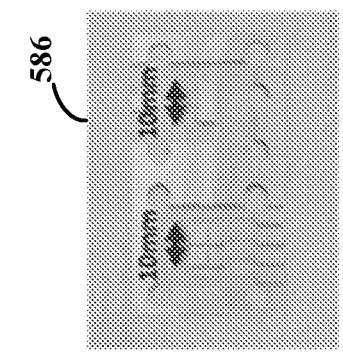

As shown by FIGS. 5A-5C, in specific embodiments, the fabrication consists of electrode patterning (e.g., FIG. 5A), dielectric forming (e.g., FIG. 5B) and alignment (e.g., FIG. 5C). Each of FIGS. 5A-5C illustrates a side view and top view of the fabrication process. FIG. 5D illustrates an example of an end product of each step.

As shown by FIG. 5A, the electrodes may be patterned on the first substrate 567 and the second substrate 570 resulting in four electrode layers. Various techniques may be used to pattern the electrodes 571, 572, 573, 574, 575. As an example, an ultra violet laser machining is used to fabricate the electrodes, which offers the advantages of versatility in both ablation and cut, and computer-assisted one-step processing with mass production capabilities. Other examples include photolithography, laser ablation, inkjet printing or 3D printing. An example of the patterned electrodes 586 is illustrated by FIG. 5D. In such embodiments, conductive material layer is patterned on a flexible film to electrodes, wires, and alignment references to align and stack electrodes with different patterns. To put the electrodes in the posts of alignment step, the circles on the edge of electrode patterns are cut by photolithography, laser cut or cutting printer.

As shown by FIG. 5B, various different dielectrics are formed, which include the dielectric layer 569 having apertures and, in various embodiments, various primers and electric layers on the substrates 570 (e.g., over the electrodes). The dielectric layer 569 may be formed using a variety of techniques used to fabricate a porous structure such that the dielectric layer 569 is made from photolithography, laser ablation, laser additive, inkjet printing, 3D printing, dissolvable material frame, emulsion droplet frame to sponge frame technique. FIG. 5D illustrates a result 587 from Droplet-based Microfluidic-assisted Emulsion Self-Assembly (DMESA) technique. After frame-removal and cure of the elastomer, depending on the porous structure fabrication method, different size of pores in a thin elastomer frame can be made, which modulate the sensitivity and the sensing range of multi-directional forces. Each substrate may be coated with a primer and elastomer. The second substrate 570 is illustrated as first being coated with a primer 580 proximal to the electrodes 574, 575 and then being coated with an elastomer 581, such as a room temperature curable elastomer. Although not illustrated, the first substrate 567 may additionally have primer and/or elastomer coatings.

As shown by FIG. 5C, the sensor apparatus is assembled. An example assembly involves alignment with holes and poles, and/or lamination with primer treated electrodes and a room-temperature curable elastomer. For example, alignment can be performed using an alignment mark between electrode layers or a simple benchtop process involving alignment with holes and poles. Lamination between dielectric and electrode layer can be done by any adhesives or adhesion technique. The fabricated sensor apparatus may be connected to sensor circuitry used to sense the forces and additional processing circuitry, such as a circuit board (e.g., analog-to-digital converter (ADC) circuit board) and, optionally, attached to the robot fingers of robot hands. The optical image of the integrated sensor is shown by 577 of FIG. 5D. In a specific embodiment, the total dimension of the sensor is 10×10×3.2 mm, following that of patterned electrodes is 10×10×0.05 mm, and that of the microstructure is 10×10×3 mm. The dimension is decided to work in a range of up to a maximum of 500 kPa normal pressure and 3 mm shear displacement (33 kPa). The target range is higher than the typical human tactile sensing range (~10 kPa) since a sensor in robotic applications has better robustness to high-pressure events. The microscopic images of the electrode layers, the dielectric layer, and the assembled device are shown by FIG. 5D. The diameter of the porous microstructure of the inset microscopic image is 300 μm.

Figure 6A:
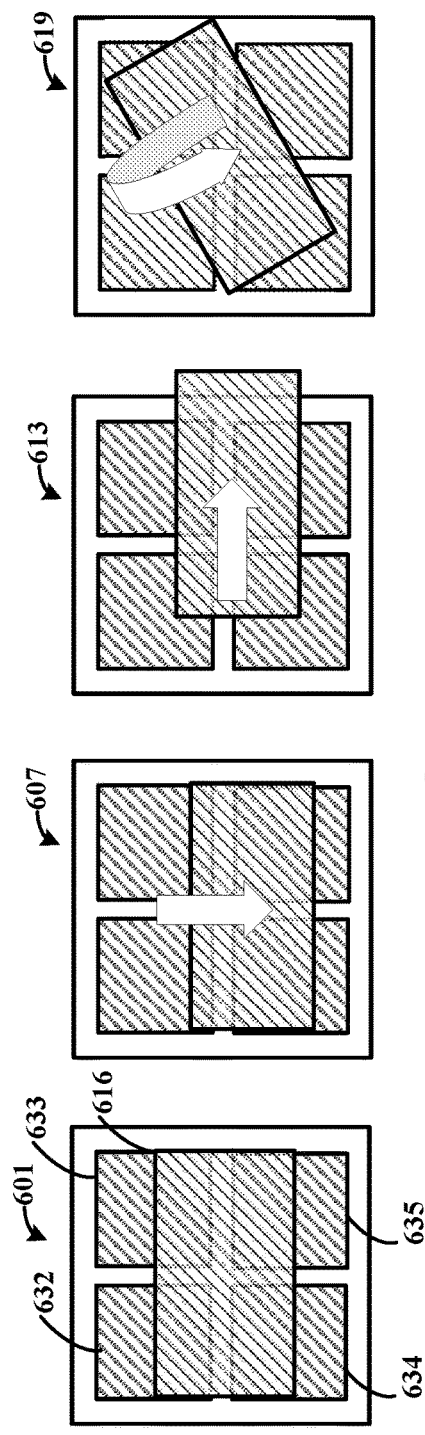
FIGS. 6A-6C show an example of a sensor apparatus under different forces, consistent with embodiments of the present disclosure.
Figure 6B:
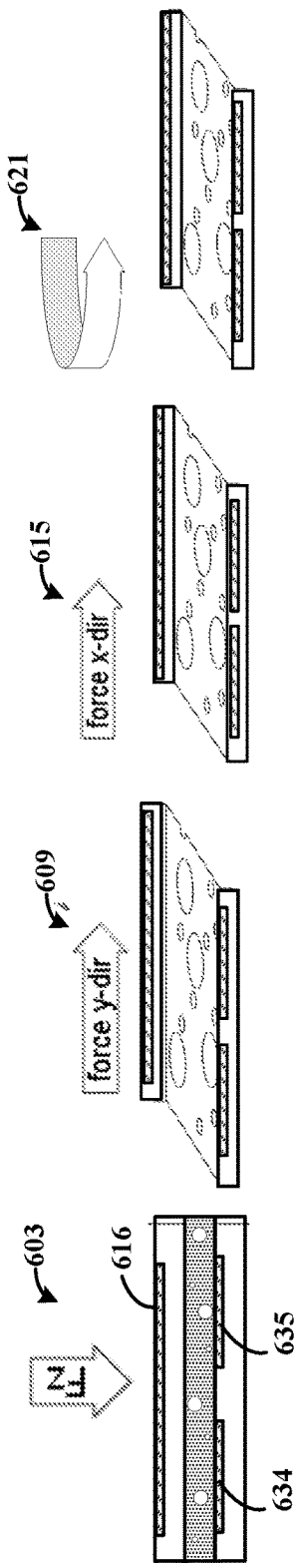
Figure 6C:
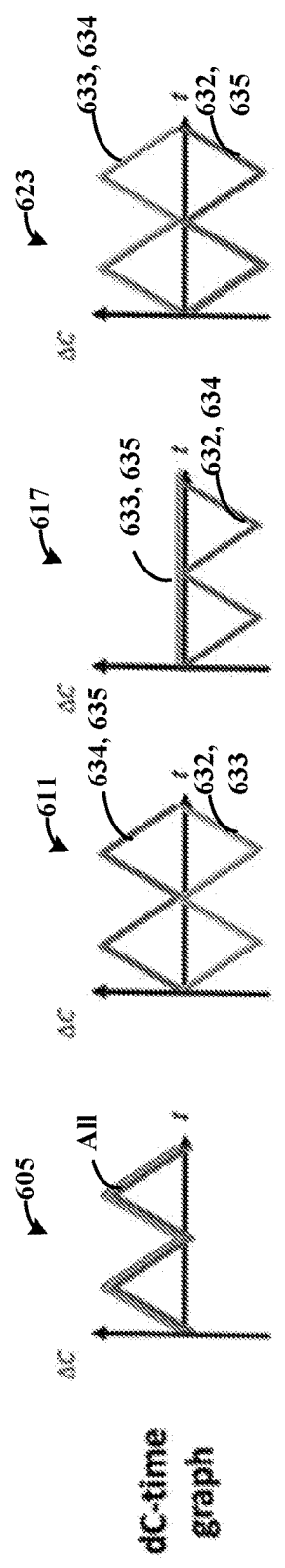

FIGS. 6A-6C show an example sensor apparatus under different forces, consistent with embodiments of the present disclosure. The sensor apparatus may be consistent with the sensor as described by FIGS. 4A and 5A-5C and has a first substrate with a first electrode 616, a second substrate with four electrodes 632, 633, 634, 635 and a dielectric layer having apertures there between.

To measure a normal force, for example, when normal force is applied as illustrated by the top view 601 and the side view 603, the gap distance (e.g., distance between the electrode pairs and the other/upper substrate) decreases (or otherwise changes) equally on the four electrodes pairs (C1, C2, C3, C4), leading to equal changes (e.g., increase) in capacitance in all electrode pairs, as shown by the graph 605. The normal force can be classified by the average of capacitance of four electrode pairs using sensor circuitry.

To distinguish between normal and shear forces, the direction of a shear force and torsion can be determined by comparing the different changes of capacitance in the four electrode pairs, as illustrated by the top views of 607, 613, 619. The overlapped areas on the four electrode pairs exhibit distinct changes in capacitances according to the direction of force. More specifically, a decrease or increase in capacitance can be used to distinguish between shear and normal forces. As the second substrate includes four (or more) electrodes, the direction of a shear force can be determined by comparing the different changes of capacitance in the electrode pairs.

For instance, when a y-directional shear force is applied from top to bottom side, as illustrated by the top view 607 and the side view 609, the overlapped areas increase and capacitance of the top electrode pairs decrease, while the bottom electrode pairs have an overlap area that is decreased and capacitance increases, as shown by the graph 611. When an x-directional shear force is applied from left to right side, as illustrated by the top view 613 and side view 615, the overlapped area, which is proportional to the capacitance, the left electrode pairs decrease in capacitance, while the others increase in response to changes of the overlapped area, as shown by the graph 617.

In addition, the sensor apparatus can distinguish between torsion and shear forces. The combination of decrease or increase in capacitance of electrode pairs can be different, such as parallel side pairs for shear force and diagonal side pairs for torsion. When a torque shear force, such as the illustrated torque x-axis force is applied in a rotation from the top-right toward the bottom left side, as illustrated by the top view 619 and the side view 621, the overlapped area and capacitance of the top-right and bottom-left corner electrode pairs (e.g., associated with electrodes 633, 634) increase, while the others decrease, as shown by the graph 623.

These differing behaviors allow for the sensor circuitry of the sensor apparatus to determine the direction of shear force. As would be appreciated by one of skill, left/right, top/bottom is with reference to the respective top views 601, 607, 613, 619, and upper/lower is with reference to the side views 603, 609, 615, 621.

The sensor circuitry can distinguish between torsion and diagonal shear force based on the design of the upper electrode. For example, the sensor circuitry can monitor the changes in capacitance exhibited by the rectangular electrode to distinguish between the torsion and diagonal shear forces. Although embodiments are not so limited, and the upper electrode may be cross-shaped, such as illustrated by FIG. 4D and further illustrated by FIGS. 7A-7B. When torsion is applied, capacitance can change in quadratic since the overlapped area changes in triangles. On the other hand, diagonal shear force changes the overlapped area in squares (or rectangles) that changes the capacitance in linear.

Figure 7A:
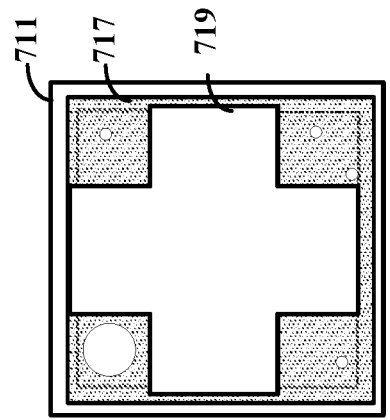
FIGS. 7A-7B show an example composition of a sensor apparatus as illustrated by FIG. 4A consistent with embodiments of the present disclosure.
Figure 7A:
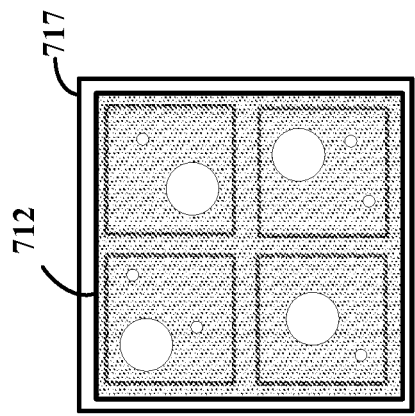
Figure 7A:
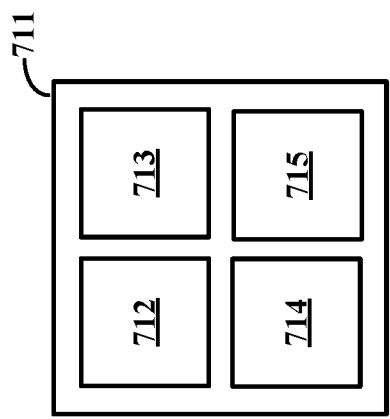
Figure 7B:
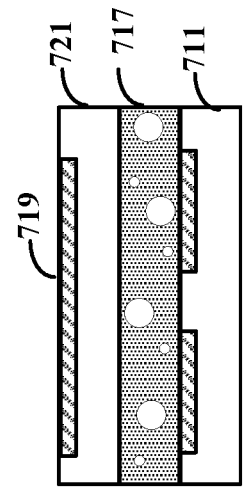
Figure 7B:
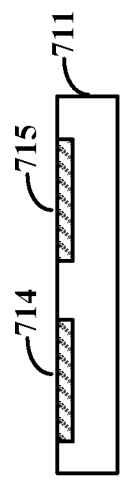

FIGS. 7A-7B show an example composition of the sensor apparatus as illustrated by FIG. 4A, consistent with embodiments of the present disclosure. The shape of these electrodes is that of a cross on the upper layer 721 and four squares or rectangles on the lower layer 711. FIG. 7A illustrates the sensor apparatus from a top-down view and FIG. 7B illustrates a side view.

The magnitude of normal and shear static forces can be measured by measuring, monitoring and/or analyzing changes in capacitance derived from changes in distances between electrode pairs (e.g., the gap distance) and changes in overlapping areas of the electrode pairs, respectively, using sensor circuitry. The normal and shear forces can be distinguished based on the comparison of capacitance from each electrode pairs (e.g., formed by the electrodes 712, 713, 714, 715 of the lower layer 711 and the electrode 719 of the upper layer 721). As used herein, normal forces includes or refers to pressure or compression forces on the sensor apparatus. Between the upper layer 721 and the lower layer 711 is a dielectric layer 717.

FIGS. 8A-8B show an example of a sensor apparatus under different forces, consistent with embodiments of the present disclosure, such as the apparatus illustrated by FIG. 4A. FIG. 8A illustrates the sensor circuitry from a top-down view and FIG. 8B illustrates a side view.

As previously described, when normal force is applied as illustrated by the top view 820 and the side view 821, the gap distance (e.g., distance between the electrode pairs and/or the electrode and the other/upper substrate) decreases (or otherwise changes) equally on the four electrodes of the lower (e.g., first) substrate, leading to equal changes in capacitance in all electrode pairs. To distinguish between normal and shear forces, the direction of a shear force can be determined by comparing the different changes of capacitance in the four electrode pairs, as illustrated by the top view of 822 and 824. The overlapped areas on the four electrode pairs exhibit distinct changes in their capacitances according to the direction of force. When an x-directional shear force is applied from left to right side, as illustrated by the top view 822 and side view 823, the overlapped area, which is proportional to the capacitance, of left electrode pairs decrease, while the others increase in response to changes of overlapped area. When a y-directional shear force is applied from top to bottom side, as illustrated by the top view 824 and the side view 825, the overlapped area and capacitance of top electrode pairs decrease, while the others increase. As would be appreciated by one of skill, left/right, top/bottom is with reference to the respective top views 820, 822, 824, and upper/lower is with reference to the side views 821, 823, 825.

The sensor circuitry can distinguish between torsion and diagonal shear force based on the design of the cross-shaped upper electrode. For example, the sensor circuitry can monitor the changes in capacitance exhibited by the cross-shaped electrode to distinguish between the torsion and diagonal shear forces. When torsion is applied, capacitance can change in quadratic since the overlapped area changes in triangles. On the other hand, diagonal shear force changes the overlapped area in squares (or rectangles) which changes the capacitance in linear.

The sensor circuitry can measure dynamic force by using the same transduction technology used for the static force by applying a high sampling rate (>500 Hz). In specific embodiments, the sensor circuitry includes at least one capacitance-to-digital converter (CDC) circuitry that connects at least some of the electrodes to an input channel of the CDC circuitry. The sensor circuitry can measure dynamic forces by measuring capacitance at a sample rate using the CDC circuitry and connected processing circuitry (e.g., microcontroller). To measure dynamic force by such a sampling rate, the sensor uses two CDC circuitry (Capacitance-to-Digital Converter chips) to connect the four electrode pairs to 2 of the 12 analog input channels of each chips, since a high sampling rate (>500 Hz) can be obtained from a lower number of capacitor inputs to the chip. The CDC chip consists of a sigma-delta-based CDC with 12 analog input channels and communicates with a microcontroller via an I2C bus, measuring capacitance in 0.3-1.2 kHz sampling rate, and cancelling noise from capacitors through active shield function. For more information on CDC chips and active shield function, reference may be made to AD7147, Analog, http://www.analog.com/media/en/technical-documentation/data-sheets/AD7147.pdf.

The fabrication process for the tactile sensor can address three primary components: electrode, dielectric layer, and bonding. The fabrication processing can include printing electrode pairs on one or more flexible substrates, building a dielectric layer on a first (or more) of the flexible substrates, bonding the dielectric layer of the first flexible substrate to a second flexible substrate, and optionally, repeating the process for additional layers to build a stack of electrode pairs. To print electrode patterns on flexible substrates, photolithography, laser ablation, inkjet printing or 3D printing can be employed on flexible substrate. To build dielectric layers on these patterned electrodes, a dielectric structure is made with a dielectric structure is made with various methods; such as photolithography, laser ablation, laser additive, inkjet printing, 3D printing, dissolvable material frame, emulsion droplet frame to sponge frame technique. This solidified dielectric structure can bond to a patterned electrode by chemical bond (e.g., chemical glue). The last step is to bond it to another electrode by plasma treatment and, optionally, repeat the process to stack two electrode pairs. In various specific embodiments, the fabrication process can automate alignment of electrode pairs within the sensor circuitry.

Figure 9:
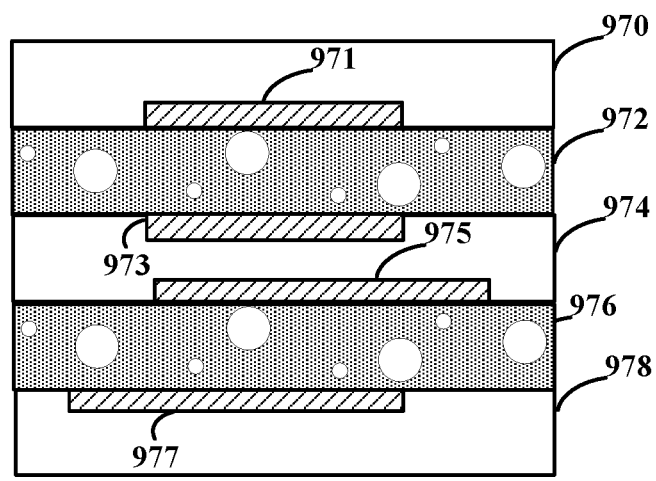
FIG. 9 shows an example sensor apparatus, consistent with embodiments of the present disclosure.

FIG. 9 shows an example sensor apparatus, consistent with embodiments of the present disclosure. In some embodiments, the sensor apparatus can include multiple capacitors formed of at least two substrates 970, 974, 978. For example, the sensor apparatus includes three substrates 970, 974, 978, each substrate having at least one electrode 971, 973, 975, 977 and being separated by dielectric layers 972, 976. The substrates 970, 974, 978, are formed of a flexible material and the electrodes 971, 973, 975, 977 can be formed on the flexible substrates. The first substrate 970 can include one electrode 971, the second substrate 974 can include two electrodes 973, 975 and the third substrate 978 can include one electrode 977, although embodiments are not so limited and each substrate may include more or less electrodes. The first substrate 970 is separated from the second substrate 974 by a first dielectric layer 972 and the second substrate 974 is separated from the third substrate 978 by a second dielectric layer 976. The electrodes of the second substrate 974, which is effectively sandwiched between the first substrate 970 and the third substrate 978 by the first and second dielectric layers 972, 976, can include a first electrode 973 that is on a surface proximal to the first dielectric layer 972 and a second electrode 975 on a surface proximal to the second dielectric layer 976. In specific embodiments, each of the electrodes can be rectangular shaped, however embodiments are not so limited.

The dielectric layers 972, 976 can be formed of a dielectric material. In specific embodiments, the dielectric layers 972, 976 include a plurality of apertures. In other embodiments, one of the dielectric layers includes a plurality of rectangular-shaped dielectric structures formed in a pattern and with gaps between the respective dielectric structures.

Figure 10A:
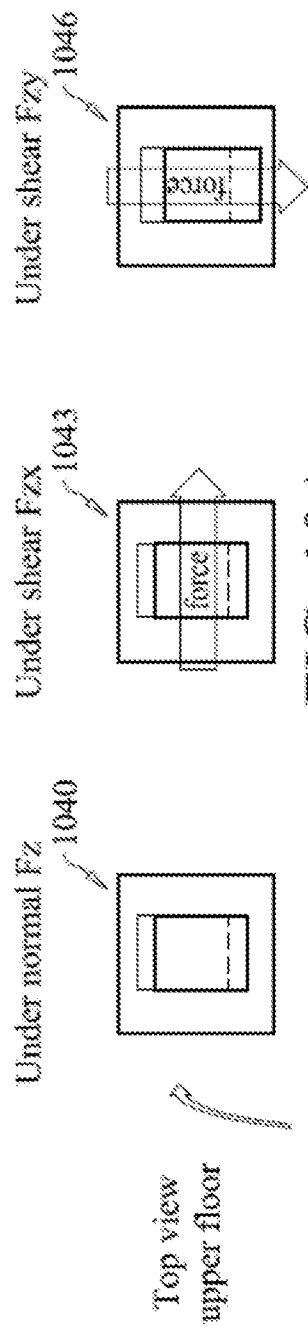
FIGS. 10A-10C show an example of a sensor apparatus under different forces, consistent with embodiments of the present disclosure.
Figure 10B:
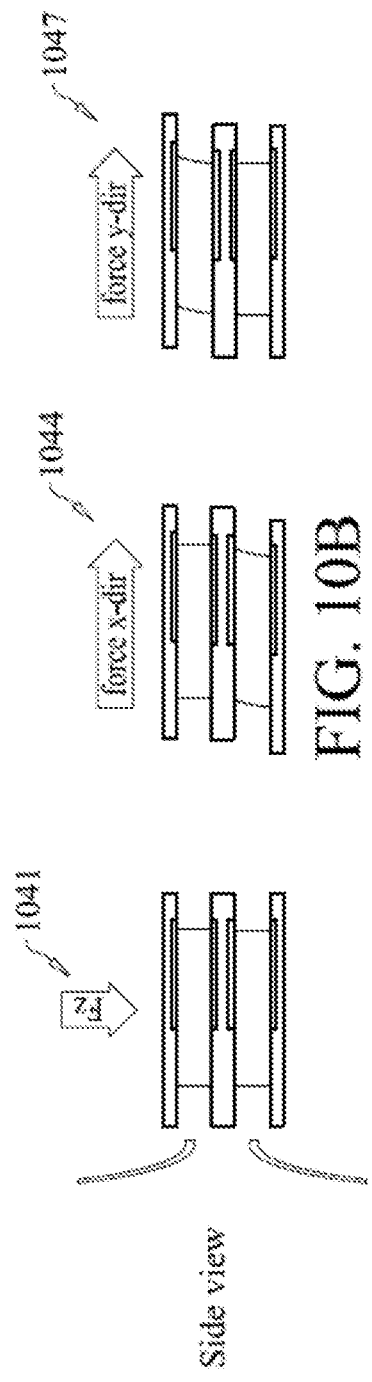
Figure 10C:
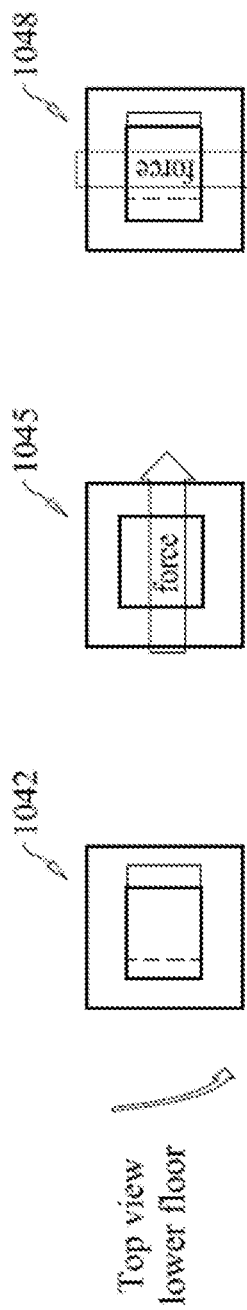

FIGS. 10A-10C show an example of a sensor apparatus under different forces, consistent with embodiments of the present disclosure, such as the apparatus illustrated by FIG. 9. The apparatus illustrated by FIG. 9 may further distinguish between different forces. The apparatus includes at least an upper electrode pair (e.g., electrodes 971 and 973 of FIG. 9) and a lower electrode pair (e.g., electrodes 975, 977 of FIG. 9). FIG. 10A illustrates the sensor apparatus from a top-down view of the upper electrode pair (e.g., the second electrode pair), FIG. 10B illustrates a side view, and FIG. 10C illustrates a top view of the lower electrode pair (e.g., the first electrode pair). The sensor circuitry can be used to measure the magnitude of normal and shear static forces, similar to the above described sensor circuitry illustrated by FIG. 9 by analyzing changes in capacitance derived from changes in a gap distance and overlapping electrode area, respectively, of one or more of the electrode pairs in the stack. The normal and shear forces can be distinguished based on the comparison of capacitance from one or more of the electrode pairs.

To measure a normal force, for example, when normal force is applied as illustrated by the top view of the upper electrode pair 1040 (e.g., electrodes 971 and 973 of FIG. 9) and the top view of the lower electrode pair 1042 and the side view 1041, the gap distance decreases or otherwise changes for both the lower electrode pair and the upper electrode pair (e.g., both 971 and 973 and 975 and 977 of FIG. 9), leading to changes in capacitance in both electrode pairs. The normal force can be classified by the average of capacitance of the two electrode pairs by the sensor circuitry. To distinguish between normal and shear forces, the direction of a shear force can be determined by the sensor circuitry comparing the different changes of capacitance in the upper electrode pair and the lower electrode pair as illustrated by the top view of the upper and lower electrodes under different shear forces $F_{zx}$ and $F_{zy}$ (e.g., views 1043, 1044, 1045, 1046, 1047, 1048).

The overlapped areas on the two electrode pairs exhibit distinct changes in their capacitances according to the direction of force due to the arrangement of the first and second dielectric layers (e.g., the apertures of the first dielectric layer 972 with respect to the apertures of the second dielectric layer 976). For instance, when an x-directional shear force is applied from left to right side, as illustrated by the top views 1043, 1045 and side view 1044, the overlapped area, which is proportional to the capacitance, of the lower electrode pair decreases, while the upper electrode pair remains the same or decreases a lower amount than the lower electrode pair. These differing behaviors enable the sensor circuitry to determine the direction of shear force. When a y-directional shear force is applied from top to bottom side, as illustrated by the top views 1046, 1048 and the side view 1047, the overlapped area and capacitance of the upper electrode pair decreases, while the lower electrode pair remains the same or decreases a lower amount than the upper electrode pair.

The sensor circuitry can distinguish between torsion and diagonal shear force, in various embodiments. When torsion is applied, capacitance changes in the quadratic since the overlapped area changes in triangles. On the other hand, diagonal shear force changes the overlapped area between electrode pairs in rectangles that changes capacitance in linear. Similar to the x-axis or y-axis shear force illustrated in FIG. 6A, the changing shape of the overlapped area between electrode pairs is rectangular when diagonal shear force is applied to the sensor circuitry.

In various embodiments, the sensor apparatus includes sensor circuitry configured to be in contact with a finger. For example, FIGS. 4A-4B of the underlying provisional application show an example experimental sensing apparatus, consistent with embodiments of the present disclosure. More specifically, FIG. 4A of the underlying provisional application illustrates sensor circuitry in contact with a human finger. The sensor circuitry is thin and flexible such that it can cover the curved finger surface. FIG. 4B of the underlying provisional application illustrates sensor circuitry in communication (wired or wireless) with processing circuitry. The sensor circuitry can be connected to the processing circuitry, such as a laptop computer, by a printed circuit board. The processing circuitry can receive the signal data from the sensor circuitry and provide a graphical display of the resulting applied force on the sensor circuitry (e.g., the graph).

Various specific embodiments can include integrating the above-described sensor circuitry with robotics and prosthetics. For example, the sensor circuitry can be applied on target surfaces of robots for a robotic tactile sensing system as the mechanoreceptors of robot skin. On the robot skin or other prosthetic, a flexible three-axis capacitive tactile sensor is freely applicable and indispensable for three distinct kinds of dexterous activities: response, manipulation, and exploration; which include the activity of response of detection and reaction to external agents, manipulation of contact location and force control, and exploration of surface texture and local features. In specific implementations, the sensor circuitry is formed as part of a robotic hand and is used to detect slip of an object being held or touched by the robotic hand. In related specific aspects, the sensor circuitry is formed as part of an apparatus (e.g., robotics, prosthetics and other implementations) having a plurality of different types of sensors including the sensor circuitry, pressure sensor circuitry, strain sensor circuitry, and/or temperature sensor circuitry, among other types of sensors.

Embodiments in accordance with the present disclosure are not limited to a sensor circuitry that is placed on an exterior surface (e.g., proximal to the environment) of robotics or prosthetics apparatus and can be directed to implants or other applications. In some specific embodiments, the sensor circuitry and/or an apparatus including the sensor circuitry can be implanted under an external surface of the skin of a user or other animal, e.g., is subdermal, and or below a surface of the robotics or prosthetic, similar to or including a passive radio frequency (RF) pet implant. For example, the sensor circuitry can be implanted at a depth below the surface of the skin sufficient to be subcutaneous but not in muscle (e.g., within interstitial space of a user or other animal and/or prosthetic) and/or below a surface or the exterior surface of the robotics/prosthetic. In various embodiments, the implant is located below the surface of the skin, robotic and/or prosthetic sufficient for the implant including the sensor circuitry to communicate with external circuitry (e.g., to receive and output communications such as RF or other wireless signals).

EXPERIMENTAL/MORE DETAILED EMBODIMENTS

In various embodiments, the above-described sensor apparatuses may be used for robotic type applications. Tactile sensing may be used for contact detection and tool manipulation. A sensor apparatus may be used in a robot, to provide a tactile sensing system. As a specific example, a robot hands may be made to mimic and help humans using the tactile sensing ability to analyze contact detection and object manipulation by detecting and distinguishing a contact force in the vector space in real time. To provide this ability to various robot hands like human-mechanoreceptors, flexible multi-axis tactile sensors, as described above, may cover various surfaces of the robot. The sensor apparatus has a flexible form factor for its irregular surface, and delivering an analyzed contact force information, which distinguishes normal (z-axis) and shear (x and y-axis), and a rotation force (z-axis centered) with human-skin-like high sensitivity (<1 kPa) and wide range (>100 kPa). In addition, tactile sensing is provided with a spatial resolution of 1-2 sensors on a fingertip, and 0-60 Hz human-skin-like response time.

Accordingly, the above-described sensor apparatuses may be used to provide a flexible multi-axis-sensitive force sensor that can be used for dexterous robot hands. The sensor can detect and distinguish a combined force in z-axial normal force, x-axial shear force, y-axial shear force, and rotational force by electrode shape and dielectric structure design. The sensor has high force sensitivity (<5 kPa (normal) and <1 kPa (shear) force resolution) and wide force range (>500 kPa (normal) and >33 kPa (shear) force range) by large-porous elastomer-based dielectric layer. In addition, the spatial resolution is so that 1-2 sensors can be applied on fingertips. The response time 100 Hz, which is higher than human mechanoreceptor (0-60 Hz) to detect force in real time.

Figure 11:
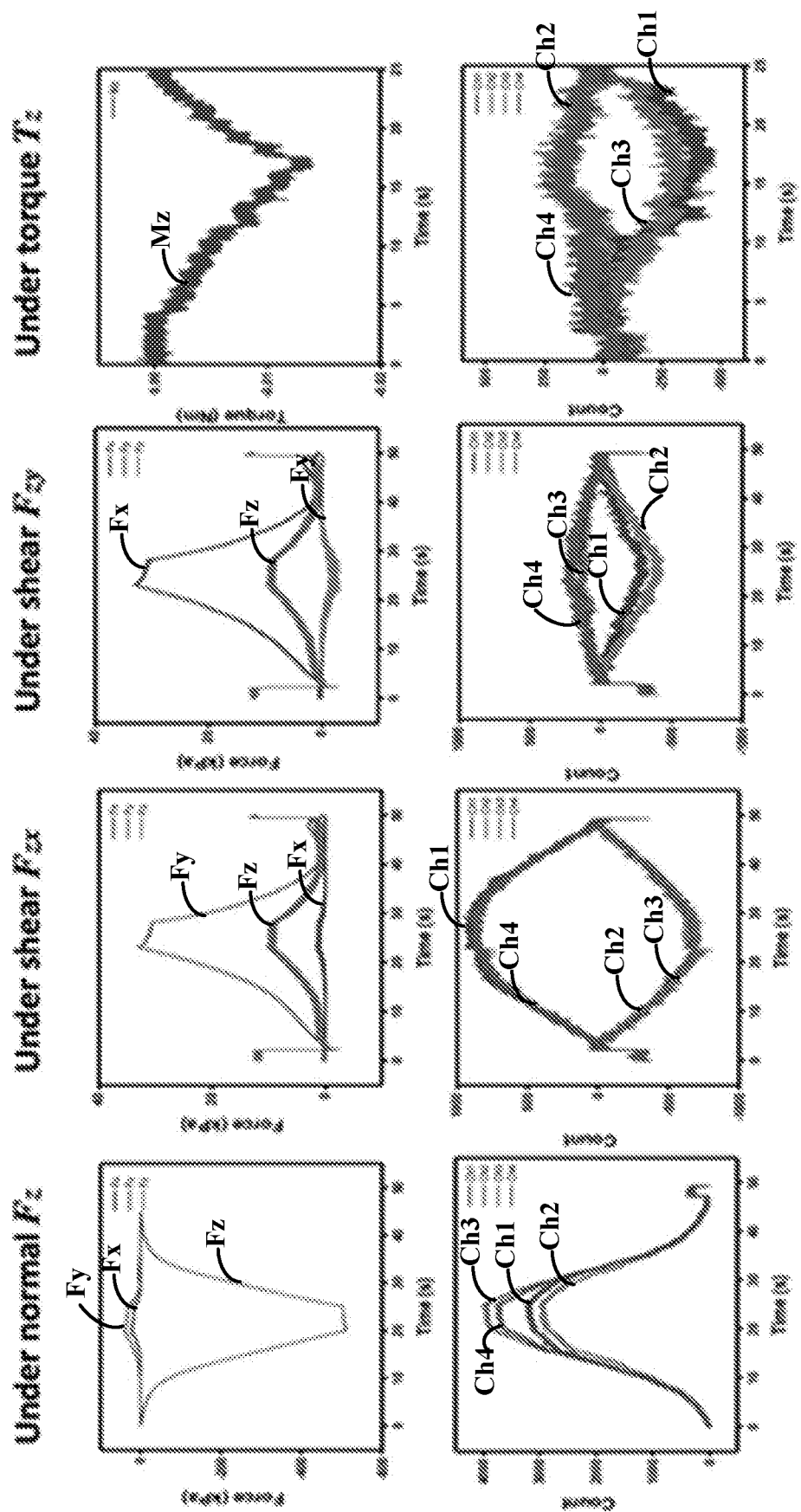
FIG. 11 shows example performance of a sensor apparatus, consistent with embodiments of the present disclosure.

FIG. 11 shows example performance of a sensor apparatus, consistent with embodiments of the present disclosure. The sensor apparatus may be consistent with the sensor as described by FIGS. 4A and 5A-5C. In various embodiments, the sensor apparatus is stretchable with a low tensile modulus, having low hysteresis but wide force range in order to manipulate the wide spectrum of objects from light-weighted to heavy-weighted multiple times. It is proved by showing the results of capacitive response to 300 kPa normal force, 30 kPa in-plane shear forces, and 20-degree in-plane rotation, which shows the force sensitivity and force range of the sensor.

More specifically, FIG. 11 illustrates experiment results of applying normal, x-direction shear forces, y-directional shear forces, and torque forces, such as those illustrated by FIGS. 6A-6C.

As previously described, the normal force can be classified by the average of capacitance of four electrode pairs by sensor circuitry. In some specific embodiments, the sensing range of the normal force is 0 to 500 kPa for z-direction. While 500 kPa normal pressure increases, the capacitance of all four electrode pairs increases as 3500 count, which linearly corresponds to capacitance. All electrode pairs respond to normal pressure in the same capacitive trend, since the gap distance of all four capacitors decreases equally.

To distinguish between normal and shear forces, the direction of a shear force and torsion can be determined by comparing the different changes of capacitance in the four electrode pairs. For example, when a y-directional shear force increases from 0 to 33 kPa for y-direction, the capacitance of the electrode pairs on the side of the applied force direction increases to 800 counts. On the other hand, the rest of those decrease 750 count, which is the same amount of the increased capacitance of the electrode pairs on the other side. Ground (e.g., top) and four-channel electrodes (e.g., bottom) respond to +y directional shear pressure in opposite capacitive trends, since the overlap area of upper side capacitors increases when the overlap area of the lower capacitors decreases. The capacitive difference between ground (top) and four-channel electrodes (bottom) pairs can be used to calculate the magnitude of the y-directional shear pressure.

For an x-directional shear force, the x-directional shear pressure applied is from 0 to 33 kPa, and the capacitance of the electrode pairs on the side of applied force direction increases 100 count, which is a result from fringe capacitation. On the other hand, the rest of the electrode pairs decrease 400 count, which is a much larger amount of the increased capacitance of the electrode pairs on the other side. This is different from y-directional shear pressure response because the shape of the ground electrode (e.g., top) is not square-shape but long-rectangular-shape, the shorter edge of which is aligned to the edge of four-channel electrodes (e.g., bottom). Left and right electrode pairs respond to −x directional shear pressure in opposite capacitive trends with different amounts, since the overlap area of right capacitors, decreases when that of left capacitors remains unchanged. Without overlap area and gap change, the capacitances of the left electrode pairs increase due to the fringe capacitance from its left edge to the increased ground electrode (top) to react. The capacitive difference between left and right electrode pairs can be used to calculate the magnitude of the x-directional shear pressure.

For torque forces, the combination of decrease or increase of capacitance of electrode pairs are different; as in parallel side pairs for shear force and diagonal side pairs for torsion. As a specific example, when the z-centered rotational pressure is applied from 0 to 20 degrees, the capacitance of the electrode pairs on the upper right side and the lower left side increased 250 counts. On the other hand, the rest of those decrease 250 count, which is the same amount of the increased capacitance of the electrode pairs on the other side. The upper right side and the lower left side electrode pairs respond to +z centered rotational pressure in opposite capacitive trend with the lower right side and the upper left side, since the overlap area of the upper right side and the lower left side capacitors increase when others decrease. The capacitive difference between diagonal side electrode pairs can be used to calculate the magnitude of the z-centered rotational pressure.

Figure 12A:
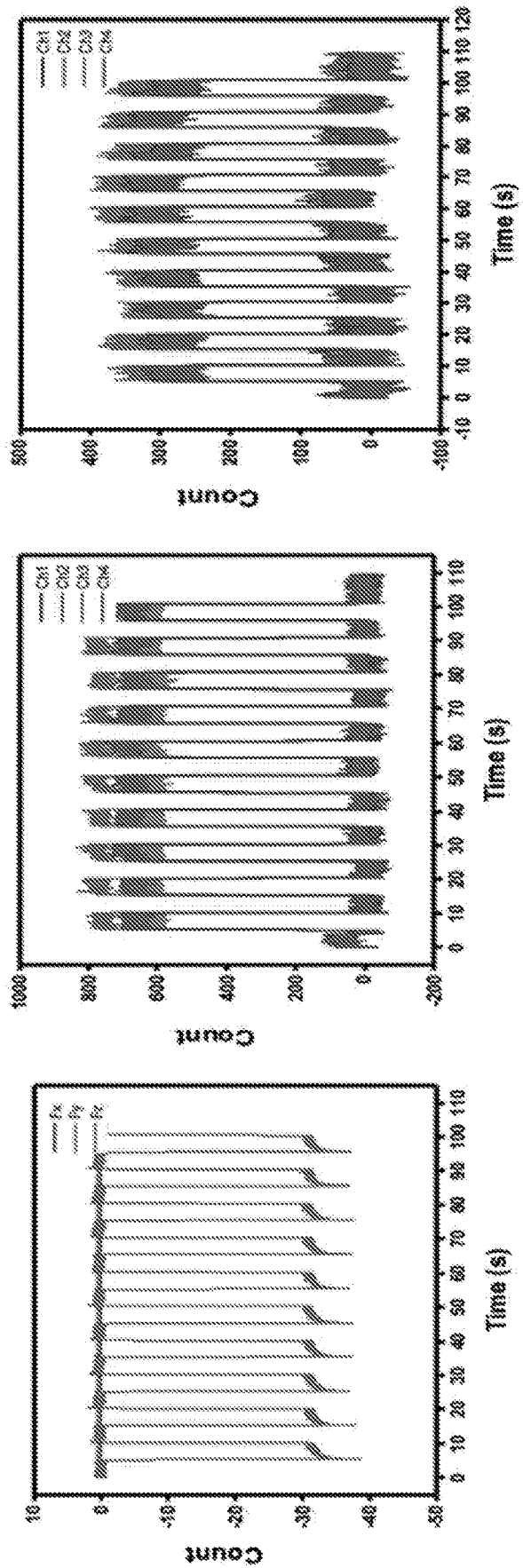
FIGS. 12A-12C show example repetitive sensing using a sensor apparatus, consistent with embodiments of the present disclosure.
Figure 12B:
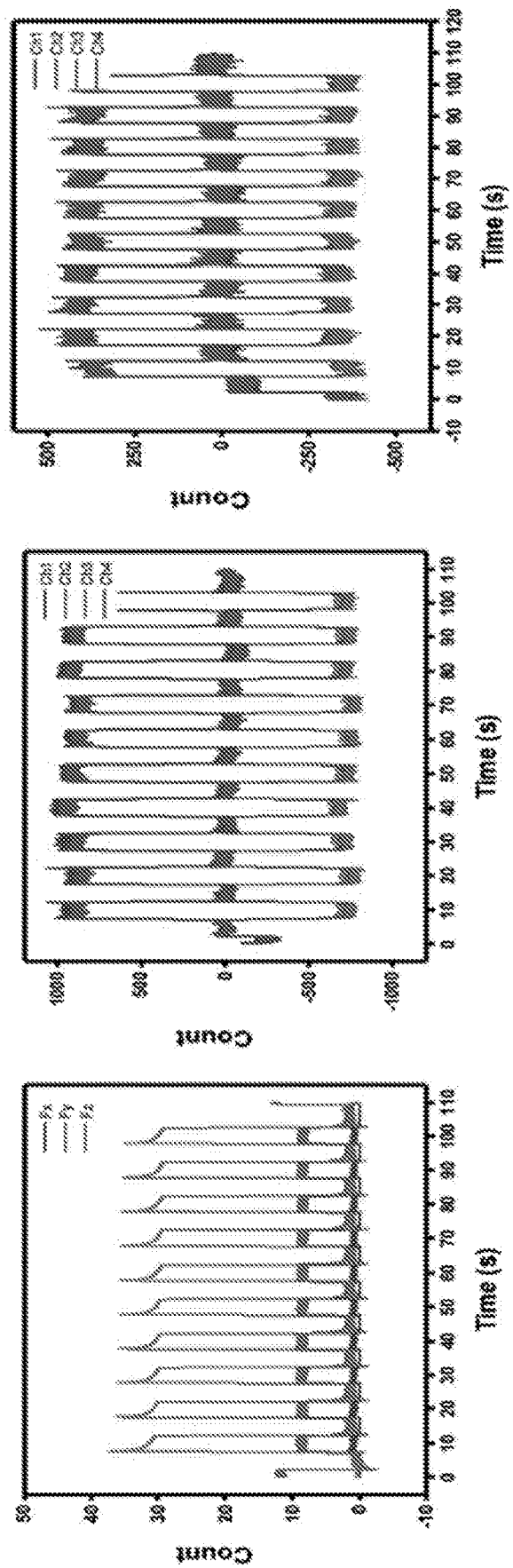
Figure 12C:
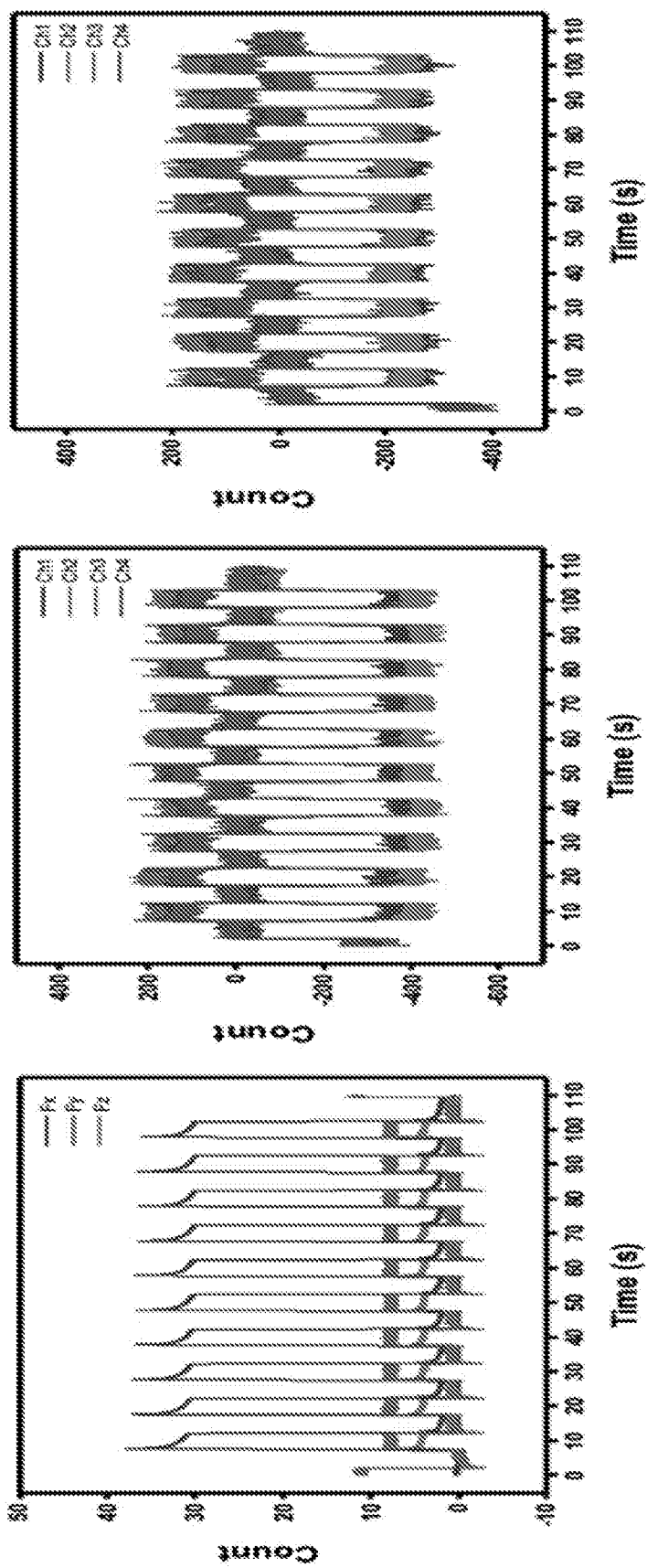

FIGS. 12A-12C show example repetitive sensing using a sensor apparatus consistent with embodiments of the present disclosure. In various applications, such as with robotics, the sensor apparatus detects multiple forces, which may include multiple time cycles without a break. FIGS. 12A-12C show that the sensor response curves from ten consecutive loading-unloading cycles produce the same capacitive response repeatedly for each force input: z-directional normal (FIG. 12A), y-directional shear (FIG. 12 C), and x-directional shear (FIG. 12C, and with each illustrating the applied forces (e.g., left, illustrates applied force 300 kpa, 30 kPA), measured (middle illustrating applied force of 300 kPa normal, and 30 kPa shear), and measured (e.g., left illustrating applied force of 100 kPa normal, and 10 kPa shear). This shows the repeatability of the sensing by showing the results of ten-cycles of 300 kPa normal and 30 kPa shear forces applied to the sensor. When multiple pressures are applied, the sensor output is reproducible, and the characteristics of the device were not altered by the high pressures. In addition, the sensor apparatus can measure normal and shear pressures independently from each other.

After applying a constant normal pressure of 300 kPa and releasing to 0 kPa for cycles, the difference of minimum and maximum capacitance (Cmin and Cmax) values increase around 700 counts. Moreover, there is around ten percent change in capacitance to 300 kPa for 10 cycles. Constantly, the difference in minimum and maximum capacitance values increased to around 300 counts after applying a constant normal pressure of 100 kPa and releasing to 0 kPa for 10 cycles.

After applying a constant y-directional shear pressure of 10 kPa and releasing to kPa for 10 cycles, the difference of minimum and maximum capacitance (Cmin and Cmax) values increase around 800 counts. The difference in minimum and maximum capacitance values increased by around 400 counts, after applying a constant normal pressure of 10 kPa and releasing to 0 kPa for 10 cycles.

After applying a constant x-directional shear pressure of 10 kPa and releasing to kPa for 10 cycles, the difference of minimum and maximum capacitance (Cmin and Cmax) values decreases around 400 counts in response to overlap area change, while the others increase 150 counts in response to fringe capacitance change. After applying a constant normal pressure of 10 kPa and releasing to 0 kPa for 10 cycles, the difference of minimum and maximum capacitance values decrease around 250 counts while the others increase 100 counts.

These values are in agreement with sensor characteristics in FIG. 11 (as well as FIGS. 6A-6C). Consecutive pressure measurements with increasing maximum pressures indicate that the device output is reproducible even with large pressures up to 300 kPa for normal direction and 30 kPa for shear direction. The sensor response cycled repeatedly, which can be used in applications for repeated object manipulation by the sensor. Similar to the sensing characterized results, consecutive pressure measurements with increasing maximum pressures indicate that the device output is reproducible even with large applied pressures up to 300 kPa for normal direction and 30 kPa for shear direction. In addition, the fast response time (10 ms) and cycling durability satisfy the requirements for real-time monitoring for object manipulation.

Figure 13A:
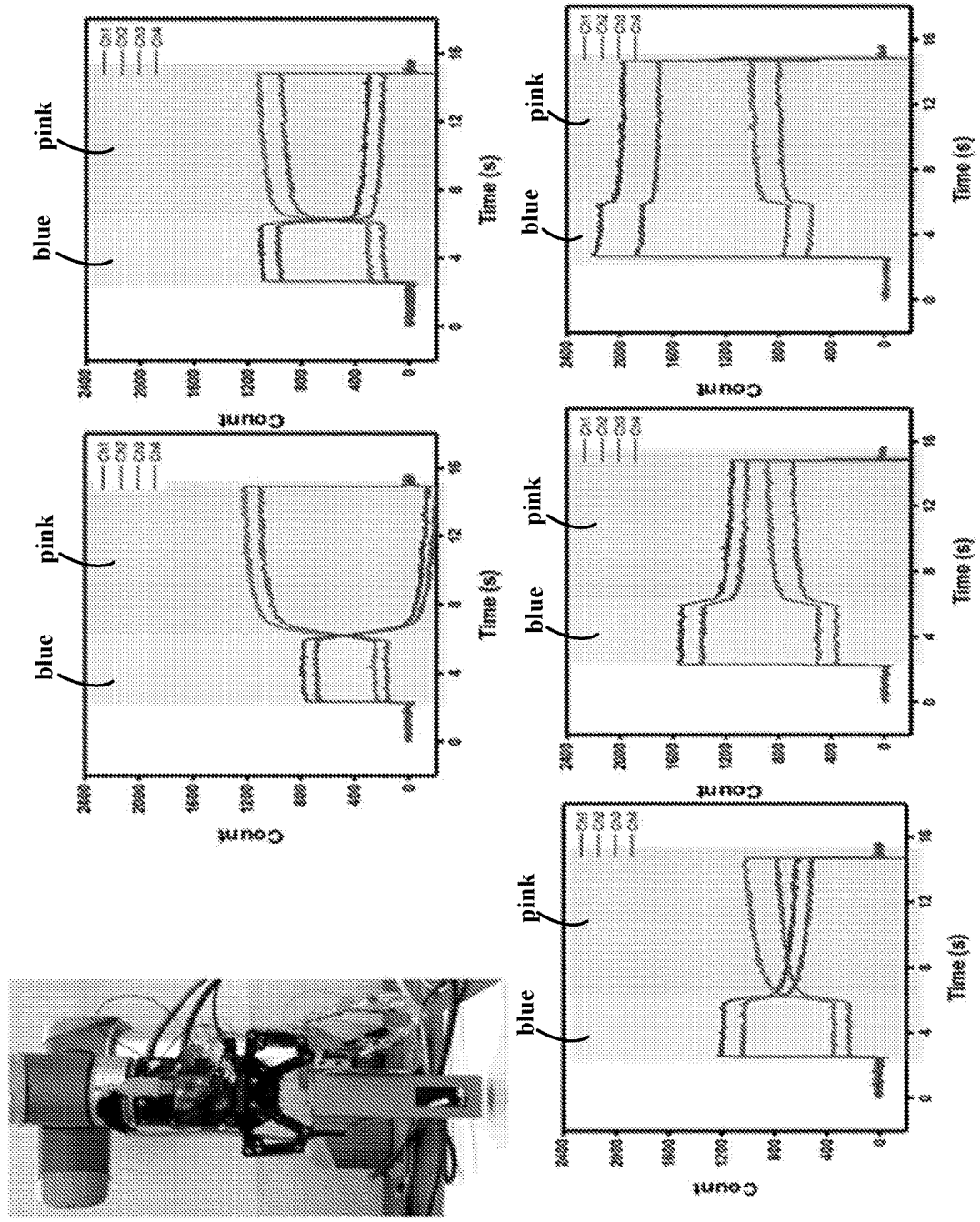
FIGS. 13A-13C show example performance of a sensor apparatus, consistent with embodiments of the present disclosure.
Figure 13B:
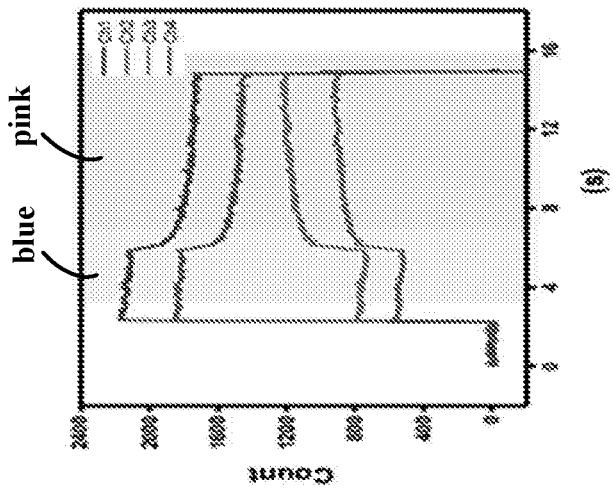
Figure 13B:
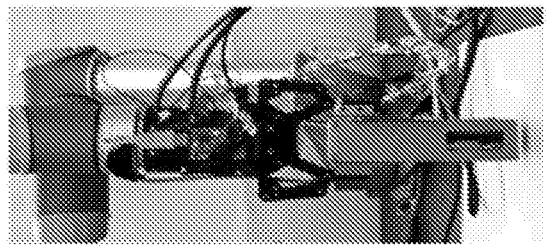
Figure 13B:
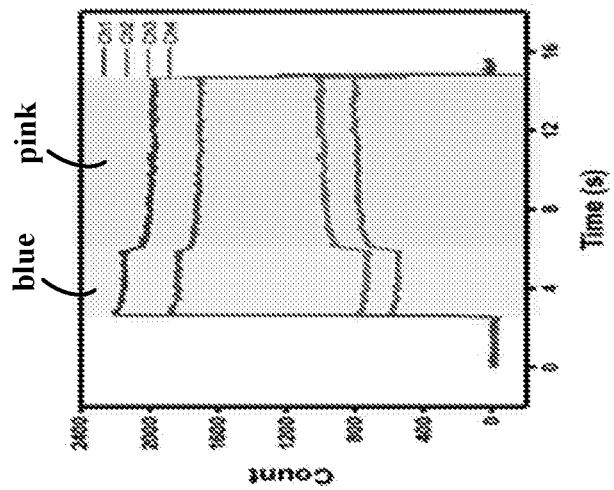
Figure 13B:
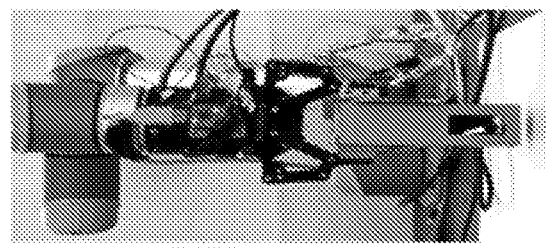
Figure 13C:
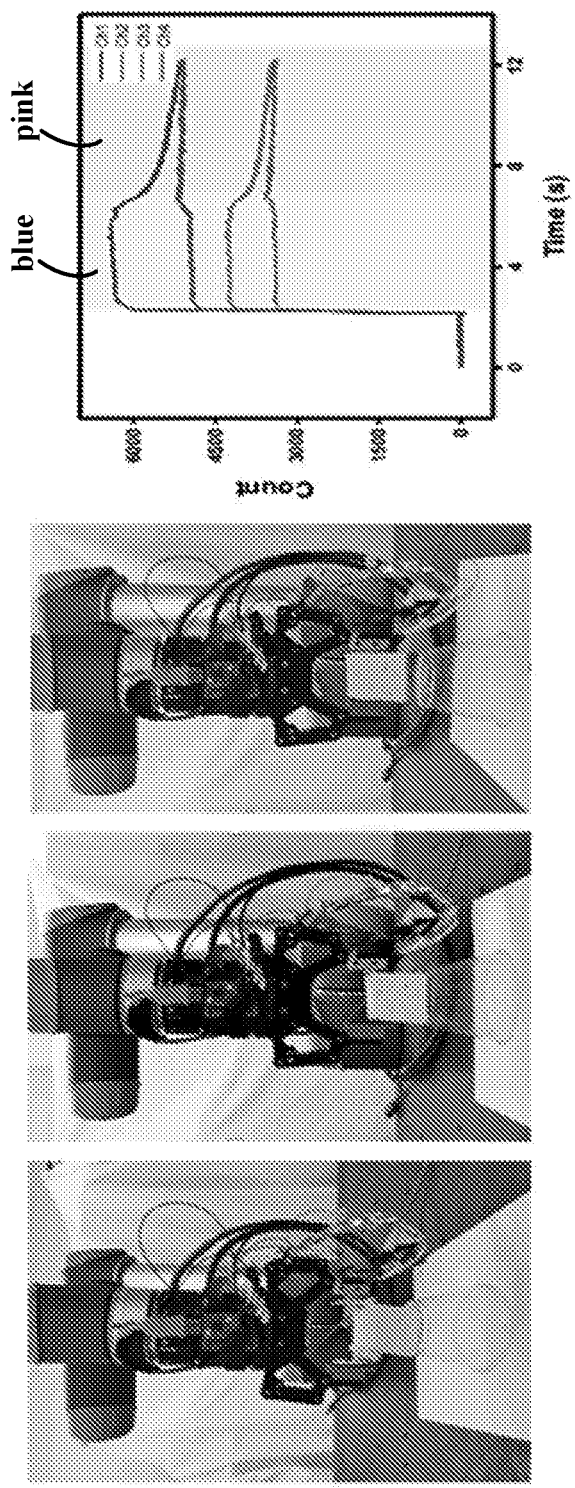

FIGS. 13A-13C show example performance of a sensor apparatus, consistent with embodiments of the present disclosure. In a specific experimental embodiment, the sensor apparatus is attached on the surface of various shaped fingers of a robot hand and the tactile sensing ability is tested. While grasping and lifting light and fragile objects, such as tofu, the sensor transfers the magnitude and the direction of the applied force with regards to the surface of the finger of the robot hand in digital counts. The sensor assesses real-time force interaction, allowing feedback-control during object manipulation.

More specifically, FIGS. 13A-13C illustrate sensor integration on a robot finger. The flexible multi-axis tactile sensor can be a robotic skin, which recognizes a changing contact force during object manipulation. The sensor is attached to a finger of a robotic hand fixed on a robot arm and classify a force magnitude and directions with regards to the surface in real time by connecting the sensor to a multiplexing circuit. The sensor communicates with the processing circuit. The processing circuit can receive analog capacitive data from the sensor, and provide digital values to the computer corresponding to the applied force on the sensor. After sensor and circuit integration, sensor-integrated Robotic 2-finger robot hands and UR5 robot arm are programmed to grasp and lift a brown box. The left image shows the experimental setup for the grasping control, while the right graph shows the corresponding electrical response during the grasping and lifting.

Blue area on the graph indicates the capacitive response during the moment of grasping an object. The pink area on the graph indicates the capacitive response during the moment of lifting which induces shear pressure due to the weight of the object and the friction between the surface of the sensor and the object. Grasping shows a normal response as capacitance increases in all electrode pairs. Lifting shows shear response as the capacitance of upper side electrode pairs increases while the others decrease.

FIG. 13A shows the result of tactile sensing while grasping and lifting a box with a weight. The different parameter between the left and right of FIG. 13A is the grasping force; the lifting weight (200 g) and lifting height are the same. The case of lifting an object with increasing normal pressure is measured, which is applied by 72, 74, 76, 78, 80 finger gap parameter, respectively. When comparing the result graphs, the normal pressure response increases as 800, 1000, 1200, 1600, 2200 counts change as maximum, while the shear pressure response decreases as 1000, 800, 600, 400, 200 counts difference as the grasping force increases. From the capacitive response, the applied normal force and shear force for each lifting task can be analyzed.

FIG. 13B shows the result of the same task with different lifting weight from left to right image and graph; the grasping force (a distance of finger gap) and lifting height is the same. The left image and graph in FIG. 13B shows the case of lifting the 200 g object, while the right image and graph show the case of lifting the 400 g object. By comparison between the results, on the next of the images of the experiment setup, the normal pressure response is the same in results of both 200 g and 400 g object as 600, 1150, 1300, 800 counts change for Ch1, Ch2, Ch3, Ch4; while the shear pressure response is increased from 200 counts difference to 400 counts difference as the weight increases 200 g to 400 g. From the capacitive response, each force component can be measured from the combination of fixed normal force with different shear force during 200 g and 400 g lifting tasks.

As shown in FIG. 13C, an advanced application with fragile object manipulation is performed to demonstrate the advantage of using the sensor as the electronic skin of the robot hand for manipulating fragile objects. Tofu is the object, which is soft and fragile to grasp and manipulate, even for a human. With control of grasping pressure of the robot hand, and integrating the highly-sensitive and multi-directional-force-distinguishable sensor, tasks requiring high dexterity are accomplished. The demonstration was conducted under the preprogrammed movements, in the sequence of grasping, lifting, and dropping, executed by the robot hand and robot arm. The left two images of FIG. 13C show the results of failure when the finger could not apply the proper amount of grasping force. The left image shows, when high grasping force is applied, the object can be smashed. The middle image shows, when low grasping force is applied, the object cannot be lifted while the hand moves upward, but the slip has occurred on the surface of the robot hand. When the exact amount of grasping is applied with the force sensor on the finger, the robot hand lifts the object without damage on it, as shown in the right image. The tofu (weight of 105 g) is placed and pressed between the two robot fingers (blue area on the graph), and normal pressure from grasping is detected as 3500, 4200, 4700, 6200 count capacitance change in all four electrode pairs. As soon as the robot arm went vertically upward, both normal pressure (pink area on the graph) and shear pressure are exerted on the device.

Specific sensor apparatuses in accordance with the present disclosure can measure and distinguish combined normal and shear pressure during different object manipulation as applying different normal pressure and shear pressure. The sensor responds to normal pressure as capacitance changes in all four electrodes and the average capacitance is used to analyze the normal pressure. On the other hand, the sensor responds to shear pressure, even with normal pressure, as differences in capacitances that increase in two electrodes while capacitances decrease in others, so the subtraction of the capacitance is used to analyze the shear pressure. The demonstration illustrated tactile sensing capabilities of the device, which allows the robotic device to interact with deformable, even stretchable, and fragile object by manipulating tofu.

In various embodiments, the multi-directional-sensitive force sensor is integrated with electronic skin for a robot hand. The sensor is composed of a patterned four electrode pairs which sandwich porous dielectric structure, and are able to measure and distinguish four directional forces in real time; z-directional normal force, x- and y-directional in-plane shear force, and z-centered in-plane rotation. The sensor is integrated and performed various dexterous tasks on a robot hand. The flexibility, light-weight, and robustness broaden the potential applications that need to conform to surfaces which are curved or have edges, in robotics, prosthetics, and various other surface types. The high-sensitivity, wide-sensing-range, and directional sensing capabilities enable its future application in various fields of robotics, including food processing, medical diagnosis, surgery, industry, and exploratory missions in hard-to-reach places, such as subterranean areas.

In specific experimental embodiments, the above described apparatuses are fabricated by patterning electrodes, building a dielectric structure and bonding these elements with alignment.

The sensor apparatus and electrodes can be designed based on the specific sensors. For example, materials of the sensors are the four-flexible metalized mylars, hundreds nm-thick conductive material is ablated or printed on top of a micron-thick flexible film, including PET), PolyImide Kapton (PI), and ITO film, and a stretchable elastomer, that can form porous structures and the pores do not stick with each other when the porous elastomer is pressed with a pressure, such as SBS, SEBS, PVDF-HFP, PDMS, PU. These materials can be altered by considering mechanical and electrical properties of the target application. The electrode material is flexible and the dielectric material is flexible and stretchable to make a flexible sensor responsive for multi-axis force.

Based on the design of the sensor, the electrode is fabricated by photolithography, laser ablation, inkjet printing or 3D printing, such as patterning a conductive material layer on a flexible film to electrodes, wires, and alignment references to align and stack electrodes with different patterns. To put the electrodes in the posts of alignment step, the circles on the edge of electrode patterns are cut by photolithography, laser cut or cutting printer.

The dielectric structure can be made by various techniques for porous structure fabrication used to make a dielectric layer from photolithography, laser ablation, laser additive, inkjet printing, 3D printing, dissolvable material frame, emulsion droplet frame to sponge frame technique. To build a dielectric structure which contains empty pores, one example technique involves a template that is subsequently removed to make a porous elastomer and which leaves behind the 3D porous microstructure elastomer with various aperture size depending on the applications. Pore size of porous dielectric is tunable; smaller pore size is useful for higher force range and higher base capacitance values by fabrication of a thinner layer. Large pores are expected to be more sensitive. Higher dielectric elastomer is also expected to be more sensitive. Another technique includes a droplet-based microfluidic assisted emulsion self-assembly (DMESA) technique. An aqueous solution consisting of deionized water flows through perpendicularly arranged capillary tubes and injected into the oil solution consisting of hexadecane/PDMS/curing agent/span 80 (surfactant). The surfactant is added to the oil solution to prevent merging of water droplets with each other since the water-oil interface acts as steric barriers. By controlling the relative flow rates of the two solutions, the water droplet size can be precisely controlled from 100 to 500 μm. During the PDMS curing process (80° C. for 3 h), the gas permeability of PDMS allows the water evaporates, leaving behind the 3D porous microstructure PDMS with uniform micropore size. Although embodiments are not so limited and a variety of techniques can be used such as using a template that may be subsequently removed.

Bonding under alignment (e.g., integrating electrodes with dielectric layer/integration of sensor device) includes bonding the dielectric structure to two electrodes with alignment, and an alignment stage is prepared. This stage consists of a breadboard and optical posts, which meets the shape of cut holes in electrodes. To create a strong bonding between electrode layers and the dielectric layer, an adhesive that can bond both the elastomer and the electrode surface may be used. As an example, prepared PDMS porous dielectric structure is bonded to the adhesive-primer-treated-electrodes with an adhesive. Although embodiments are not so limited and a variety of different types of adhesives may be used to bond the elastomer and the electrode surface.

The patterned electrodes and solidified porous dielectric structure is stacked with reference hole and optical posts which are fixed on a breadboard. The stack is in a series of shield electrode-ground electrode (top)—adhesive-dielectric structure—adhesive-four-channel electrodes (bottom)—shield electrode. The shield layers are made of the same material as the electrode layers, and bonded to the ground (top) and four-channel electrodes (bottom) by adhesive (e.g., tape).

Various embodiments are implemented in accordance with the underlying Provisional Application (Ser. No. 62/696,221), entitled "Capacitive and Tactile Sensors and Related Sensing Methods," filed Jul. 10, 2018 with an Appendix, to which benefit is claimed and which are both fully incorporated herein by reference for their general and specific teachings. For instance, embodiments herein and/or in the Provisional Application and its Appendix may be combined in varying degrees (including wholly). Reference may also be made to the experimental teachings and underlying references provided in the underlying provisional application. Embodiments discussed in the Provisional Application are not intended, in any way, to be limiting to the overall technical disclosure, or to any part of the claimed disclosure unless specifically noted.

Further, he Appendix which forms part of this Provisional Application, is incorporated by reference for their teachings. Various embodiments can be used in various combinations with the features, aspects, applications and other teachings as disclosed in the attached Appendix (and also in PCT Patent Application Serial No. PCT/US2011/051222 entitled: PRESSURE SENSING APPARATUSES AND METHODS (Publication No. WO 2012/034121)). The Appendix describes and illustrates sensor circuitry having different regions of shapes to detect different levels of pressure. For example, as noted above in various specific embodiments, the sensor circuitry and/or a plurality of sensor circuits are place on surfaces of a robot and/or part of a robot that approximates the size of a human hand as illustrated by FIGS. 7A-7B of the Appendix. The sensor circuitry can be used to approximate the properties of human mechanoreceptors and for detecting a variety of forces, including shear and normal forces. It is recognized that the various figures and descriptions herein can be used in combination with a variety of different structures and technical applications as described in the above-referenced Appendix, which is fully incorporated herein by reference for all it contains.

Terms to exemplify orientation, such as top view/side view, before or after, upper/lower, left/right, top/bottom, above/below, and x-direction/y-direction/z-direction, may be used herein to refer to relative positions of elements as shown in the figures. It should be understood that the terminology is used for notational convenience only and that in actual use the disclosed structures may be oriented differently than the orientation shown in the figures. Thus, the terms should not be construed in a limiting manner.

As examples, the Specification describes and/or illustrates aspects useful for implementing the claimed disclosure by way of various circuits or circuitry which may be illustrated as or using terms such as blocks, modules, device, system, unit, controller, and/or other circuit-type depictions. Such circuits or circuitry are used together with other elements (robotics, electronic devices, prosthetics, processing circuitry and the like) to exemplify how certain embodiments may be carried out in the form or structures, steps, functions, operations, activities, etc. For example, in certain of the above-discussed embodiments, one or more illustrated items in this context represent circuits (e.g., discrete logic circuitry or (semi)-programmable circuits) for implementing these operations/activities, as may be carried out in the approaches shown in the figures. In certain embodiments, such illustrated items represent one or more circuitry and/or processing circuitry (e.g., microcomputer or other CPU) which is understood to include memory circuitry that stores code (program to be executed as a set/sets of instructions) for performing a basic algorithm (e.g., inputting, counting signals having certain signal strength or amplitude, classifying the type of force including a magnitude and direction using capacitance values output by the sensor circuitry, sampling), and/or involving sliding window averaging, and/or a more complex process/algorithm as would be appreciated from known literature describing such specific-parameter sensing. Such processes/algorithms would be specifically implemented to perform the related steps, functions, operations, activities, as appropriate for the specific application. The Specification may also make reference to an adjective that does not connote any attribute of the structure ("first [type of structure]" and "second [type of structure]") in which case the adjective is merely used for English-language antecedence to differentiate one such similarly-named structure from another similarly-named structure (e.g., "first electrode . . . " is interpreted as "electrode configured to . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the scope of various aspects of the disclosure, including aspects set forth in the claims.

What is claimed:

1. A sensor apparatus, comprising:
a capacitor including
a first substrate having a first electrode;
a second substrate having a second electrode; and
a dielectric layer having a section of dielectric material that encapsulates a plurality of apertures and that does not fill the plurality of apertures, the first and second electrodes being separated by the section of dielectric material and arranged with an overlapping area with respect to one another; and
sensor circuitry coupled to the capacitor and configured to detect normal and shear forces applied to the sensor apparatus based on changes in capacitance derived from changes in at least one of a distance between the first and second electrodes and the overlapping area of the first and second electrodes.

2. The apparatus of claim 1, wherein the plurality of apertures are of different sizes for setting different sensitivities for detection of the normal and shear forces, and the sensor circuitry is configured to distinguish between the shear and normal forces, in response to at least one of the plurality of apertures changing shape due to at least a shear force among the shear and normal forces, by obtaining a capacitance value from the electrode pair and comparing the same.

3. The apparatus of claim 1, wherein the first substrate includes the first electrode, a third electrode, a fourth electrode, and a fifth electrode arranged in a pattern, and the second substrate includes at least the second electrode.

4. The apparatus of claim 3, further including processing circuitry in communication with the sensor circuitry, wherein the sensor circuitry is to define a magnitude of the normal and shear forces by measuring changes in capacitance derived from changes in a gap distance between the first electrode and the second electrode and provide signals indicative of the magnitude of the normal forces, and comparing changes in capacitance derived from changes in an overlapping area between the first electrode and the second electrode, the third electrode and the second electrode, and the fourth electrode and the second electrode, and the fifth electrode and the second electrode to provide signals indicative of the magnitude of the shear forces to the processing circuitry.

5. The apparatus of claim 1, wherein the plurality of apertures are arranged in a pattern to set a sensitivity of the sensor apparatus and are arranged to manifest deformation in terms of shape in response an applied normal force, in response to an applied in-plane force, and in response to an applied torque shear force, and wherein the sensor circuitry is further to detect the applied normal force, the applied in-plane force, and the applied torque shear force.

6. The apparatus of claim 1, wherein the sensor circuitry includes capacitance-to-digital converter circuitry that couples the first electrode of the first substrate to an input channel of the capacitance-to-digital converter circuitry, and the sensor circuitry is configured to measure capacitance at a sampling rate using the capacitance-to-digital converter circuitry and connected processing circuitry.

7. The apparatus of claim 1, wherein the apparatus includes a third substrate, the first substrate including the first electrode, the second substrate including at least the second electrode and a third electrode, and the third substrate including a fourth electrode, wherein the dielectric layer includes a first dielectric layer arranged between the first and second substrates and a second dielectric layer arranged between the second and third substrates.

8. The apparatus of claim 7, wherein the first and second dielectric layers include a plurality of apertures within.

9. The apparatus of claim 1, wherein the plurality of apertures have a shape and dimensions contributing to at least one of: a specific force range, and a sensitivity of the apparatus, and at least one of the plurality of apertures is to respond to a force in a direction normal to a plane along the dielectric layer by deforming in terms of shape as manifested by opposing boundaries of said at least one of the plurality of apertures becoming nearer one another.

10. The apparatus of claim 1, wherein the first and second electrodes are formed of a material selected from metal, carbon nanomaterial, metal nanowires, and conductive polymers, and the dielectric layer is formed of a polymer, and the first and second electrodes are among a set of electrodes, also including a third electrode and a fourth electrode, wherein the set of electrodes are arranged in a shape having crossing elongated sections, and the sensor circuitry is to use the shape having crossing elongated sections to distinguish between torsion and diagonal shear forces.

11. The apparatus of claim 1, further including one or more additional electrodes used as a part of a transducer circuit and further including a passively or inductively powered circuit configured to provide power to at least the sensor circuitry.

12. The apparatus of claim 1, further including a wireless communication circuit for wirelessly communicating signals from the sensor circuitry.

13. The apparatus of claim 1, wherein the first and second substrates are formed of a flexible material, and at least one of the first and second electrodes is configured in a cross shape.

14. The apparatus of claim 1, further including processing circuitry, wherein the sensor circuitry is to define a magnitude of x, y, z, and rotation forces by measuring changes in capacitance derived from changes in a gap distance between the first electrode and the second electrode and which provides signals indicative of the magnitude of the x, y, z, and rotation forces to the processing circuitry.

15. The apparatus of claim 1, wherein the first and second substrates are flexible and are configured to enable the sensor circuitry to be applied on human limbs, on or over edges of surfaces, and on or over curved surfaces.

16. A method comprising:
printing electrode patterns on flexible substrates to form:
a first flexible substrate having a first electrode; and
a second flexible substrate having a second electrode;
providing a dielectric layer, having a section of dielectric material that encapsulates a plurality of apertures therein and that does not fill the plurality of apertures, and that is arranged on or against the first flexible substrate; and
combining the dielectric layer and the second flexible substrate into at least part of a sensor apparatus such that the first and second electrodes are separated by the section of dielectric material and are overlapping with respect to one another, and wherein differently-sized apertures in the section of dielectric material respectively correspond to different ranges in which the sensor apparatus is to detect normal and shear forces.

17. The method of claim 16, wherein combining the dielectric layer and the second flexible substrate includes forming a capacitor, and the method further includes coupling the capacitor to sensor circuitry that is configured to detect normal and shear forces applied to the sensor apparatus based on changes in capacitance derived from changes in at least one of a distance between the first and second electrodes and the overlapping area of the first and second electrodes.

18. The method of claim 16, wherein combining the dielectric layer and the second flexible substrate includes bonding the dielectric layer to the second flexible substrate.

19. The method of claim 16, wherein providing the dielectric layer includes curing and bonding dielectric material under a patterned electrode, as patterned on the flexible substrates.

20. The method of claim 16, further including providing the sensor apparatus as part of a robotic or prosthetic apparatus.

21. The method of claim 16, wherein the plurality of apertures are arranged in a pattern.

22. A method comprising:
printing electrode patterns on flexible substrates to form:
a first flexible substrate having a first electrode; and
a second flexible substrate having a second electrode;
providing a dielectric layer, having a section of dielectric material that encapsulates a plurality of apertures, that does not fill the apertures, and that is arranged on or against the first flexible substrate; and
combining the dielectric layer and the second flexible substrate into at least part of a sensor apparatus such that the first and second electrodes are separated by the section of dielectric material and are overlapping with respect to one another, wherein at least one of the first and second electrodes is configured in a cross shape, and further including distinguishing between torsion and shear forces in response to forces affecting the plurality of apertures in the section of dielectric material and corresponding to capacitance changes of said at least one of the first and second electrodes.

* * * * *